US011899338B2

(12) United States Patent
Chuang et al.

(10) Patent No.: US 11,899,338 B2
(45) Date of Patent: Feb. 13, 2024

(54) DEEP ULTRAVIOLET LASER USING STRONTIUM TETRABORATE FOR FREQUENCY CONVERSION

(71) Applicant: KLA Corporation, Milpitas, CA (US)

(72) Inventors: Yung-Ho Alex Chuang, Cupertino, CA (US); Kelly Mauser, Santa Clara, CA (US); Baigang Zhang, San Jose, CA (US); Xuefeng Liu, San Jose, CA (US); John Fielden, Los Altos, CA (US); Yinying Xiao-Li, San Jose, CA (US); Elena Loginova, Campbell, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/991,198

(22) Filed: Nov. 21, 2022

(65) Prior Publication Data

US 2023/0185158 A1    Jun. 15, 2023

Related U.S. Application Data

(60) Provisional application No. 63/288,560, filed on Dec. 11, 2021.

(51) Int. Cl.
*G02F 1/35* (2006.01)
*G02F 1/355* (2006.01)
(Continued)

(52) U.S. Cl.
CPC ....... *G02F 1/3534* (2013.01); *G01N 21/4738* (2013.01); *G02F 1/3507* (2021.01);
(Continued)

(58) Field of Classification Search
CPC .... G02F 1/3534; G02F 1/3507; G02F 1/3542; G02F 1/3548; G02F 1/3551; G02F 1/37;
(Continued)

(56) References Cited

U.S. PATENT DOCUMENTS

| 5,742,626 A | 4/1998 | Mead et al. |
| 6,201,601 B1 | 3/2001 | Vaez-Iravani et al. |

(Continued)

FOREIGN PATENT DOCUMENTS

| EP | 3062075 A1 | 8/2016 |
| WO | 2020132043 A1 | 6/2020 |

(Continued)

OTHER PUBLICATIONS

Korean Intellectual Property Office, International Search Report and Written Opinion for International Application No. PCT/US2022/051300, dated Apr. 4, 2023, 8 pages.

(Continued)

*Primary Examiner* — David P Porta
*Assistant Examiner* — Mamadou Faye
(74) *Attorney, Agent, or Firm* — Suiter Swantz pc llo

(57) ABSTRACT

A nonlinear crystal including stacked strontium tetraborate $SrB_4O_7$ (SBO) crystal plates that are cooperatively configured to create a periodic structure for quasi-phase-matching (QPM) is used in the final frequency doubling stage of a laser assembly to generate laser output light having a wavelength in the range of about 180 nm to 200 nm. One or more fundamental laser beams are frequency doubled, down-converted and/or summed using one or more frequency conversion stages to generate an intermediate frequency light with a corresponding wavelength in the range of about 360 nm to 400 nm, and then the final frequency converting stage utilizes the nonlinear crystal to double the frequency of the intermediate frequency light to generate the desired laser output light at high power. Methods, inspection systems, lithography systems and cutting systems incorporating the laser assembly are also described.

34 Claims, 8 Drawing Sheets

(51) Int. Cl.
  *G02F 1/39* (2006.01)
  *G02F 1/37* (2006.01)
  *G01N 21/47* (2006.01)
  G01N 21/95 (2006.01)
  H01S 3/16 (2006.01)

(52) U.S. Cl.
  CPC .......... *G02F 1/3542* (2021.01); *G02F 1/3548* (2021.01); *G02F 1/3551* (2013.01); *G02F 1/37* (2013.01); *G02F 1/392* (2021.01); *G01N 21/9501* (2013.01); *G01N 2201/06113* (2013.01); *G02F 2203/11* (2013.01); *H01S 3/1625* (2013.01); *H01S 3/1636* (2013.01)

(58) Field of Classification Search
  CPC ...... G02F 1/392; G02F 2203/11; G02F 1/353; G02F 1/354; G02F 1/39; G01N 21/4738; G01N 21/9501; G01N 2201/06113; G01N 21/9505; G01N 2021/95676; G01N 21/8806; G01N 21/956; H01S 3/1625; H01S 3/1636; H01S 3/0092
  See application file for complete search history.

(56) References Cited

U.S. PATENT DOCUMENTS

| | | |
|---|---|---|
| 6,271,916 B1 | 8/2001 | Marxer et al. |
| 7,248,618 B2 | 7/2007 | Volodin et al. |
| 7,525,649 B1 | 4/2009 | Leong et al. |
| 7,817,260 B2 | 10/2010 | Chuang et al. |
| 8,298,335 B2 | 10/2012 | Armstrong |
| 8,824,514 B2 | 9/2014 | Armstrong |
| 8,976,343 B2 | 3/2015 | Genis |
| 9,023,152 B2 | 5/2015 | Dribinski |
| 9,059,560 B2 | 6/2015 | Dribinski et al. |
| 9,250,178 B2 | 2/2016 | Chuang et al. |
| 9,255,887 B2 | 2/2016 | Brunner |
| 9,293,882 B2 | 3/2016 | Chuang |
| 9,459,215 B2 | 10/2016 | Chuang et al. |
| 9,461,435 B2 | 10/2016 | Dribinski et al. |
| 9,509,112 B2 | 11/2016 | Chuang et al. |
| 9,645,287 B2 | 5/2017 | Brunner |
| 9,660,409 B2 | 5/2017 | Chuang |
| 9,709,510 B2 | 7/2017 | Kolchin et al. |
| 9,726,617 B2 | 8/2017 | Kolchin et al. |
| 10,044,166 B2 | 8/2018 | Chuang et al. |
| 10,283,366 B2 | 5/2019 | Chuang et al. |
| 10,921,261 B2 | 2/2021 | Chuang et al. |
| 11,180,866 B2 | 11/2021 | Chuang et al. |
| 11,237,455 B2 | 2/2022 | Chuang et al. |
| 11,360,032 B2 | 6/2022 | Chuang et al. |
| 11,543,732 B2 | 1/2023 | Chuang et al. |
| 11,567,391 B1 | 1/2023 | Chuang et al. |
| 2009/0067035 A1* | 3/2009 | Foster .................. G02F 1/3551 359/328 |
| 2013/0100977 A1 | 4/2013 | Smeeton et al. |
| 2014/0226140 A1 | 8/2014 | Chuang et al. |
| 2014/0305367 A1 | 10/2014 | Chuang et al. |
| 2014/0362880 A1 | 12/2014 | Chuang et al. |
| 2015/0168645 A1 | 6/2015 | Shen et al. |
| 2021/0389643 A1 | 12/2021 | Chuang et al. |
| 2023/0161221 A1 | 5/2023 | Chuang et al. |

FOREIGN PATENT DOCUMENTS

| | | |
|---|---|---|
| WO | 2021252306 A1 | 12/2021 |
| WO | 2023096734 | 6/2023 |

OTHER PUBLICATIONS

U.S. Appl. No. 17/555,404, filed Dec. 18, 2021, Chuang et al.
Trabs, P. et al., "Spectral fringes in non-phase-matched SHG and refinement of dispersion relations in the VUV", Opt. Express 23, 10091 (2015).
Oseledchik et al., "New nonlinear optical crystals: strontium and lead tetraborates," Opt. Mater. 4, 669, Jun. 15, 1995, 6 pages.
Petrov et al., "Application of the nonlinear crystal SrB4O7 for ultrafast diagnostics converting to wavelengths as short as 125 nm," Opt. Lett. 29, 373, Feb. 15, 2004, 3 pages.
Szilagyi et al., "A quasi-phase-matching technique for efficient optical mixing and frequency doubling," J. Appl. Phys. 47, 2025, Jan. 5, 1976, 8 pages.
Thompson et al., "Second-harmonic generation in GaAs "stack of plates" using high-power CO2 laser radiation," Appl. Phys. Lett. 29, 113, Mar. 22, 1976, 3 pages.

\* cited by examiner

DEEP ULTRAVIOLET LASER USING STRONTIUM TETRABORATE FOR FREQUENCY CONVERSION

CROSS-REFERENCE TO RELATED APPLICATIONS

The present claims the benefit of U.S. Provisional Application No. 63/288,560, filed on Dec. 11, 2021, which is incorporated herein by reference in the entirety.

TECHNICAL FIELD

The present application relates to lasers capable of generating light having deep ultraviolet (DUV) and vacuum ultraviolet (VUV) wavelengths, and in particular to lasers capable of generating light in the range of approximately 180 nm to 200 nm and to systems that use such lasers. Systems incorporating the lasers disclosed herein may be configured to inspect samples, such as photomasks, reticles, and semiconductor wafers. Systems incorporating the lasers disclosed herein may be configured as lithography systems for exposing patterns on substrates such as a semiconductor wafers, may be configured for cutting or drilling substrates, or may be configured for ablating or cutting biological tissue, such as in corrective eye surgery.

BACKGROUND

As dimensions of semiconductor devices shrink, the size of the smallest particle or pattern defect that can cause a device to fail also shrinks. Hence, a need arises for detecting smaller particles and defects on patterned and unpatterned semiconductor wafers and reticles. The intensity of light scattered by particles smaller than the wavelength of that light generally scales as a high power of the dimensions of that particle. For example, the total scattered intensity of light from an isolated, small, spherical particle scales proportionally to the sixth power of the diameter of the sphere and inversely proportional to the fourth power of the wavelength. Because of the increased intensity of the scattered light, shorter wavelengths will generally provide better sensitivity for detecting small particles and defects than longer wavelengths.

Since the intensity of light scattered from small particles and defects is generally very low, high illumination intensity is required to produce a signal that can be detected in a very short time. Average light source power levels of 1 W or more may be required to produce such a signal. At these high average power levels, a high pulse repetition rate is desirable as the higher the repetition rate, the lower the energy per pulse and hence the lower the risk of damage to the system optics or the article being inspected. The illumination needs for inspection and metrology are often best met by continuous wave (CW) light sources. A CW light source has a constant power level, which avoids the peak power damage issues and allows for images or data to be acquired continuously. However, in many cases, mode-locked lasers (also called quasi-CW lasers) with repetition rates of about 50 MHz or higher can be useful because the high repetition rate means that the energy per pulse can be low enough to avoid damage for many metrology and inspection applications. The higher peak power of a mode locked laser as compared with a CW laser of the same average power level can allow more efficient and simpler frequency conversion.

In particular, wavelengths near 193 nm are useful because such wavelengths are close to the shortest wavelength that can propagate reasonable distances (such as about 1 m) in dry air. Wavelengths shorter than about 190 nm are strongly absorbed by oxygen and are typically referred to as VUV wavelengths. ArF excimer lasers (also called exciplex lasers) generate a wavelength close to 193 nm and have been used for more than 20 years in the semiconductor and medical industries. However, ArF excimer lasers have several disadvantages. The maximum pulse repetition rate is about 100 kHz. Fluorine is corrosive and results in the lasers needing frequent maintenance. The pulse length can range from a few ns to about 100 ns depending on details of the laser cavity design. Some applications such as cutting and ablating materials require short pulses (e.g., about 10 ps or shorter) to minimize heating damage caused to material adjacent to that being removed.

U.S. Pat. No. 5,742,626 to Mead et al. describes a solid-state laser configured to generate wavelengths near 193 nm. This laser is complicated and therefore has low efficiency in converting the energy of the fundamental laser to light at the output wavelength. It includes five frequency conversion stages such as an OPO (optical parametric oscillator), two frequency doubling stages, and two frequency summing stages. The DUV frequency conversion stages may use BBO (beta barium borate) or CLBO (cesium lithium borate) crystals. Both materials suffer from disadvantages when used in this application. The damage threshold of BBO is relatively low when exposed to high-intensity DUV radiation. CLBO can have a higher damage threshold than BBO, but is hygroscopic requiring great care during handling, processing and operation.

Therefore, a need arises for a laser that overcomes the limitations of previous approaches as described above.

SUMMARY

A characterization system is disclosed, in accordance with one or more embodiments of the disclosure. In embodiments, the characterization system comprises a light source configured to generate light having a wavelength in a range between 180 nm and 200 nm. In embodiments, the characterization system comprises an optical system configured to direct the light onto a sample. In embodiments, the light source comprises: a first fundamental laser configured to generate a fundamental laser beam having a corresponding fundamental frequency; one or more intermediate frequency conversion stages collectively configured to generate an intermediate frequency light using the fundamental laser beam, the intermediate frequency light having an associated intermediate frequency and a corresponding intermediate wavelength between 360 nm and 400 nm; and a final frequency doubling stage configured to pass the intermediate frequency light through a nonlinear crystal. In embodiments, the nonlinear crystal includes a plurality of strontium tetraborate (SBO) crystal plates disposed in a stacked configuration such that each first SBO crystal plate is adjacent to at least one second crystal plate. In embodiments, the plurality of SBO crystal plates are cooperatively configured to form a periodic structure that achieves quasi-phase-matching (QPM) of the intermediate frequency light such that light exiting the nonlinear crystal includes laser output light having an output frequency with a corresponding wavelength in the range of approximately 180 nm to approximately 200 nm. The characterization system may be configured as an inspection system, a metrology system, or a lithography system.

A laser assembly for generating laser output light is disclosed, in accordance with one or more embodiments of the disclosure. In embodiments, the laser assembly comprises a first fundamental laser configured to generate a fundamental laser beam having a corresponding fundamental frequency. In embodiments, the laser assembly comprises one or more intermediate frequency conversion stages collectively configured to generate an intermediate frequency light using the fundamental laser beam, the intermediate frequency light having an associated intermediate frequency and a corresponding intermediate wavelength between approximately 360 nm and approximately 400 nm. In embodiments, the laser assembly comprises a final frequency doubling stage configured to pass the intermediate frequency light through a nonlinear crystal. In embodiments, the nonlinear crystal includes a plurality of strontium tetraborate (SBO) crystal plates disposed in a stacked configuration such that each first the SBO crystal plate is adjacent to at least one second the crystal plate. In embodiments, the plurality of SBO crystal plates are cooperatively configured to form a periodic structure that achieves quasi-phase-matching (QPM) of the intermediate frequency light such that light exiting the nonlinear crystal includes laser output light having the output frequency with a corresponding wavelength in the range of approximately 180 nm to approximately 200 nm.

A method for generating laser output light is disclosed, in accordance with one or more embodiments of the present disclosure. In embodiments, the method includes generating intermediate frequency light having an associated intermediate frequency and a corresponding intermediate wavelength between about 360 nm and 400 nm. In embodiments, the method includes utilizing a final frequency doubling stage to pass the intermediate frequency light through a nonlinear crystal. In embodiments, the nonlinear crystal includes a plurality of strontium tetraborate (SBO) crystal plates disposed in a stacked configuration such that each first SBO crystal plate is adjacent to at least one second the crystal plate. In embodiments, the plurality of SBO crystal plates are cooperatively configured to form a periodic structure that achieves quasi-phase-matching (QPM) of the intermediate frequency light such that light exiting the nonlinear crystal includes laser output light having an output frequency with a corresponding wavelength in the range of approximately 180 nm to approximately 200 nm.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure

BRIEF DESCRIPTION OF DRAWINGS

The numerous advantages of the disclosure may be better understood by those skilled in the art by reference to the accompanying figures.

DETAILED DESCRIPTION

Figure 1:
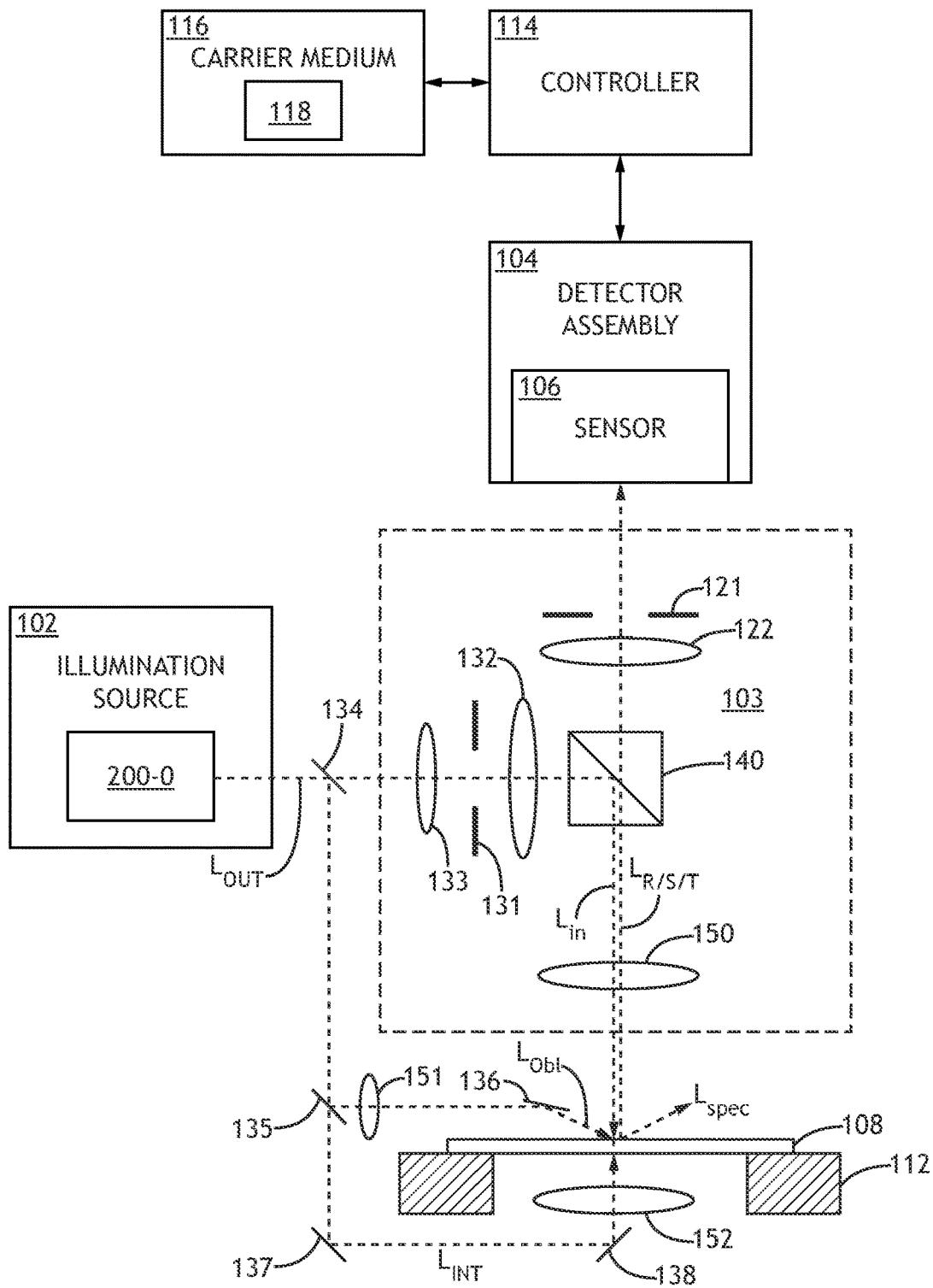
FIG. 1 illustrates a simplified block diagram depicting a characterization system configured to inspect or measure a sample, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a CW, mode-locked or short-pulse laser that generates radiation near a wavelength of 193 nm and avoids many or all of the disadvantages of prior art 193 nm lasers, and is suitable for use in systems configured for inspecting substrates, exposing a pattern into photoresist on a substrate, or drilling, cutting or ablating materials including biological tissue. Embodiments of the present disclosure are directed to lasers utilizing between two and four frequency conversion stages and configured to generate laser output light having a wavelength near 193 nm (e.g., a wavelength between about 180 nm and about 200 nm) at high power while avoiding the above-mentioned problems and disadvantages associated with prior art approaches. Note that in the following description, where a wavelength is mentioned without qualification, that wavelength may be assumed to be the wavelength in vacuum.

The frequency conversion stages generate intermediate frequency light having a wavelength between about 360 nm and 400 nm (such as a wavelength near 386 nm), and include a final frequency doubling stage that incorporates a nonlinear crystal comprising stacked strontium tetraborate $SrB_4O_7$ (SBO) crystal plates that form a periodic structure cooperatively configured to enable quasi-phase-matching (QPM) suitable for frequency doubling of the intermediate frequency light to generate the laser output light having a wavelength between about 180 nm and 200 nm (e.g., a wavelength near 193 nm).

In one embodiment, the cooperative configuration includes physically stacking separate SBO crystal plates such that the c axes of the sequentially arranged crystal plates are alternatively inverted (e.g., the crystal axis of a given SBO crystal plate is rotated by substantially 180° with respect to the crystal axis of adjacent SBO crystal plate(s)), thereby forming a periodic structure that is analogous to a periodically-poled crystal material (e.g., with each SBO crystal plate forming a physical pole in the periodic structure). Each nonlinear crystal is further configured for use in a given optical system by way of orienting the SBO crystal plates such that the inverted crystal axes are aligned substantially parallel to a polarization direction of input light as it passes through the SBO crystal stack within the optical system, and by forming the SBO crystal plates such that the thickness of at least one SBO crystal plate produces a spacing between poles (i.e., the distance traveled by light between the opposing surfaces of each plate in the light's propagation direction) that is substantially equal to an odd multiple of a critical length to enable quasi phase matching of the input light frequency and the output frequency (second harmonic of the input frequency). By cooperatively configuring two or more SBO crystal plates in this manner, nonlinear crystals produced in accordance with the present invention facilitate frequency doubling to generate light having a wavelength near 193 nm while avoiding the above-mentioned problems and disadvantages associated with prior art approaches.

In specifically disclosed embodiments described below, the present invention is directed to improvements in inspection and metrology systems utilized in the semiconductor fabrication industry, and in particular to laser assemblies for such inspection and metrology systems that are capable of generating laser light having a light source power level of about 1 W or more and having an output wavelength in the range of approximately 180 nm to approximately 200 nm, such as a wavelength near 193 nm. In a practical embodiment, a nonlinear crystal is utilized in a final frequency doubling stage of an associated laser assembly that also includes at least one fundamental laser and between one and three intermediate frequency conversion stages, where each fundamental laser respectively generates a fundamental laser beam having a corresponding fundamental frequency, and the intermediate frequency conversion stages are collectively configured to convert the fundamental laser beam(s) into an intermediate frequency light having an associated intermediate frequency corresponding to a wavelength between about 360 nm and 400 nm. The final frequency doubling stage is configured to direct the intermediate frequency light through the inverted SBO crystal plates forming the nonlinear crystal such that a polarization direction (electric field direction) of the light is substantially parallel to c-axis of each plate's crystal axes, whereby the periodic structure of the stacked SBO crystal plates achieves QPM of the intermediate frequency light and the laser output light.

In accordance with the laser assemblies and associated methods described herein with reference to a first specific embodiment, laser output light with an output frequency having a wavelength of approximately 193 nm is produced by way of generating fundamental light having a fundamental frequency with a corresponding fundamental wavelength in the range of approximately 720 nm to approximately 800 nm, utilizing the fundamental light to generate a second harmonic of the fundamental light, utilizing the second harmonic as intermediate frequency light that is then passed to the final frequency doubling stage. According to an aspect of the first embodiment, the final frequency doubling stage is configured to frequency-double the second harmonic light, by configuring the stage to include a nonlinear crystal configured to generate forth harmonic light having a frequency equal to four times the fundamental frequency. To generate fourth harmonic output light at approximately 193 nm, the linear crystal includes two or more stacked SBO crystal plates having inverted c crystal axes oriented substantially parallel to a polarization direction of the second harmonic input light, where the thickness of each plate in the light propagation direction (i.e., spacing between poles of the periodic structure) is substantially equal to an odd multiple of a quasi-phase-matching critical length approximately equal to 0.85 μm (e.g., in the range between 0.80 μm and 0.90 μm) to achieve QPM for the second harmonic frequency and the fourth harmonic frequency, thereby generating laser output light having an output wavelength of approximately 193 nm.

In accordance with the laser assemblies and associated methods described herein with reference to a second specific embodiment, laser output light with an output frequency having a corresponding wavelength of approximately 193 nm is produced by way of generating first fundamental light having a first fundamental frequency with a corresponding first fundamental wavelength in the range of approximately 1000 nm to approximately 1100 nm, utilizing the first fundamental light to generate a second harmonic of the first fundamental light, using an optical parametric oscillator (OPO) to generate light having a third frequency, summing together the second harmonic light with the light having the third frequency, and utilizing the sum of the second harmonic light and the third frequency light as intermediate frequency light that is then passed to the final frequency doubling stage. According to an aspect of the second embodiment, the final frequency doubling stage is configured to frequency-double the intermediate light, by configuring the stage to include a nonlinear crystal configured to generate a second harmonic of the intermediate light having a frequency equal to four times the first fundamental frequency plus twice the third frequency. To generate laser output light at approximately 193 nm, the linear crystal includes two or more stacked SBO crystal plates having inverted c crystal axes oriented substantially parallel to a polarization direction of the second harmonic input light, where the thickness of each plate in the light propagation direction (i.e., spacing between poles of the periodic structure) is substantially equal to an odd multiple of a quasi-phase-matching critical length approximately equal to 0.85 μm (e.g., in the range of 0.80 μm and 0.90 μm) to achieve QPM for the intermediate frequency and its second harmonic frequency, thereby generating laser output light having an output wavelength of approximately 193 nm.

In one embodiment, an inspection system configured to inspect a sample such as a wafer, reticle or photomask includes one of the lasers described herein that generates output light having a wavelength between approximately 180 nm and 200 nm. In an alternate embodiment, a lithography system configured to expose patterns onto photoresist coated on a substrate such as a semiconductor wafer includes one of the lasers described herein that generates output light having a wavelength of approximately 193 nm. In yet another embodiment, a system configured to cut, drill or ablate material, such as biological tissue, includes one of the lasers described herein that generates output light having a wavelength between approximately 180 nm and 200 nm The use of strontium tetraborate as an optical coating is discussed in U.S. Pat. No. 10,921,261, issued on Feb. 16, 2021, and U.S. Pat. No. 11,360,032, issued on Jun. 14, 2022, which are incorporated herein by reference in the entirety. This application is also related to the following U.S. patent documents, all of which are incorporated by reference herein: U.S. Pat. No. 6,201,601 to Vaez-Iravani et al., U.S. Pat. No. 6,271,916 to Marxer et al., U.S. Pat. No. 7,525,649 to Leong et al., U.S. Pat. No. 7,817,260 to Chuang et al., U.S. Pat. Nos. 8,298,335 and 8,824,514 to Armstrong, U.S.

Pat. No. 8,976,343 to Genis, U.S. Pat. No. 9,023,152 to Dribinski, U.S. Pat. Nos. 9,461,435 and 9,059,560 to Dribinski et al., U.S. Pat. Nos. 9,293,882 and 9,660,409, to Chuang, U.S. Pat. Nos. 9,250,178, 9,459,215, 9,509,112, 10,044,166 and 10,283,366 to Chuang et al., and U.S. Pat. No. 11,180,866 to Chuang et al.

FIG. 1 illustrates a characterization system 100, in accordance with one or more embodiments of the present disclosure. The characterization system 100 may be configured to inspect or measures a sample 108. The characterization system 100 may comprise an inspection system or a metrology system. Characterization system 100 may also be configured to cut, drill, or ablate material from sample 108, or to expose a pattern onto photoresist on sample 108.

Sample 108 may include any sample known in the art such as, but not limited to, a wafer, reticle, photomask, or the like. In one embodiment, the sample 108 is disposed on a stage assembly 112 to facilitate movement of the sample 108. The stage assembly 112 may include any stage assembly known in the art including, but not limited to, an X-Y stage, an R-θ stage, and the like. In another embodiment, the stage assembly 112 is capable of adjusting the height of the sample 108 during inspection to maintain focus on the sample 108. In yet another embodiment, a lens such as objective lens 150 may be moved up and down during inspection to maintain focus on the sample 108.

Characterization system 100 includes an illumination source 102 that incorporates a laser 200-0 that generates output light $L_{OUT}$ having an output frequency WOUT with a corresponding wavelength in a range between approximately 180 nm and approximately 200 nm. Details of laser 200-0 can be found in the description of FIGS. 2A-7. Illumination source 102 may include additional light sources such as a laser operating at a longer or shorter wavelength or a broadband light source. Characterization system 100 includes one or more optical components. For example, the one or more optical elements of the characterization system 100 may include, but are not limited to, beam splitters, mirrors, lenses, apertures, and waveplates that are configured to condition and direct light $L_{OUT}$ to sample 108. The optical components may be configured to illuminate an area, a line, or a spot on sample 108. In one embodiment, beam splitter or mirror 134, mirrors 137 and 138, and lens 152 are configured to illuminate sample 108 from below to enable inspection or measurement of sample 108 by transmitting light LINT through the sample. In another embodiment, beam splitters or mirrors 134 and 135, mirror 136, and lens 151 are configured to illuminate sample 108 with light at an oblique angle of incidence $L_{Obl}$ (e.g., at an angle of incidence greater than 60° relative to a normal to the sample surface). In this embodiment, the specularly reflected light $L_{Spec}$ may be blocked or discarded rather than collected. In yet another embodiment, optics 103 are collectively configured to direct illumination light $L_{IN}$ to the top surface of sample 108.

When sample 108 is illuminated in one or more of the above-described modes, optics 103 is also configured to collect light LR/s/T reflected, scattered, diffracted, transmitted and/or emitted from the sample 108 and direct and focus the light LR/S/T to sensor 106 of a detector assembly 104. It is noted herein that sensor 106 and the detector assembly 104 may include any sensor 106 known in the art. The sensor may include, but is not limited to, a charge-coupled device (CCD) detector, a complementary metal oxide semiconductor (CMOS) detector, a time-delay integration (TDI) detector, a photomultiplier tube (PMT), an avalanche photodiode (APD), a line sensor, an electron-bombarded line sensor, or the like. Detector assembly 104 is communicatively coupled to a controller 114.

Controller 114 is configured to store and/or analyze data from detector assembly 104 under control of program instructions 118 stored on carrier medium 116. Controller 114 may be further configured to control other elements of characterization system 100 such as stage 112, illumination source 102 and optics 103.

In one embodiment, the optics 103 includes an illumination tube lens 132. The illumination tube lens 132 may be configured to image an illumination pupil aperture 131 to a pupil within an objective lens 150. For example, the illumination tube lens 132 may be configured such that the illumination pupil aperture 131 and the pupil within the objective lens 150 are conjugate to one another. In one embodiment, the illumination pupil aperture 131 may be configurable by switching different apertures into the location of illumination pupil aperture 131. In another embodiment, the illumination pupil aperture 131 may be configurable by adjusting a diameter or shape of the opening of the illumination pupil aperture 131. In this regard, the sample 108 may be illuminated by different ranges of angles depending on the characterization (e.g., measurement or inspection) being performed under control of the controller 114. Illumination pupil aperture 131 may also include a polarizing element to control the polarization state of the illumination light $L_{IN}$.

In one embodiment, the one or more optical elements 103 include a collection tube lens 122. For example, the collection tube lens 122 may be configured to image the pupil within the objective lens 150 to a collection pupil aperture 121. For instance, the collection tube lens 122 may be configured such that the collection pupil aperture 121 and the pupil within the objective lens 150 are conjugate to one another. In one embodiment, the collection pupil aperture 121 may be configurable by switching different apertures into the location of collection pupil aperture 121. In another embodiment, the collection pupil aperture 121 may be configurable by adjusting a diameter or shape of the opening of collection pupil aperture 121. In this regard, different ranges of angles of illumination reflected or scattered from the sample 108 may be directed to detector assembly 104 under control of the controller 114. Collection pupil aperture 121 may also include a polarizing element so that a specific polarization of light LR/S/T can be selected for transmission to sensor 106.

In another embodiment, the illumination pupil aperture 131 and/or the collection pupil aperture 121 may include a programmable aperture. Programmable apertures are generally discussed in U.S. Pat. No. 9,255,887, entitled "2D programmable aperture mechanism," to Brunner, issued on Feb. 9, 2016; and U.S. Pat. No. 9,645,287, entitled "Flexible optical aperture mechanisms," to Brunner, issued on May 9, 2017, both of which are herein incorporated by reference in the entirety. Methods of selecting an aperture configuration for inspection are generally described in U.S. Pat. No. 9,709,510, entitled "Determining a configuration for an optical element positioned in a collection aperture during wafer inspection," to Kolchin et al., issued on Jul. 18, 2017; and U.S. Pat. No. 9,726,617, entitled "Apparatus and methods for finding a best aperture and mode to enhance defect detection," to Kolchin et al, issued on Aug. 8, 2017, both of which are herein incorporated by reference in the entirety.

The various optical elements and operating modes depicted in FIG. 1 are merely to illustrate how laser 200-0 may be used in characterization system 100 and are not intended to limit the scope of the present disclosure. A practical characterization system 100 may implement a subset or a superset of the modes and optics depicted in FIG. 1. Additional optical elements and subsystems may be incorporated as needed for a specific application.

Figure 2A:
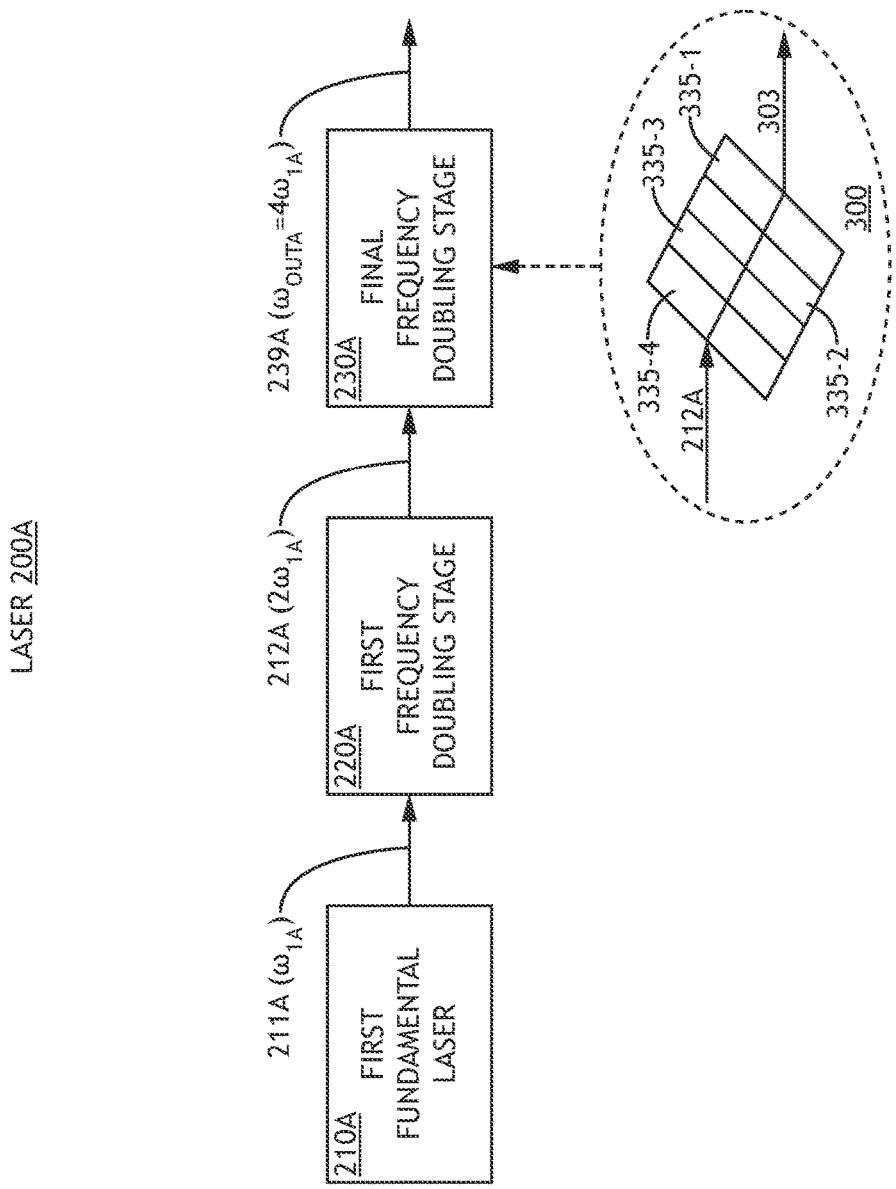
FIGS. 2A and 2B illustrate simplified block diagrams depicting simplified laser assemblies, in accordance with one or more embodiments of the present disclosure.

FIG. 2A is a simplified block diagram showing a laser assembly 200A configured to generate a wavelength in the range of approximately 180 nm to approximately 200 nm (e.g., approximately 193 nm) according to a first specific exemplary embodiment of the present invention. Laser assembly 200A comprises a first fundamental laser 210A and two frequency doubling (conversion) stages (e.g., one intermediate frequency doubling stage 220A, and a final frequency doubling stage 230A) that are cooperatively configured to generate laser output light 239A having a wavelength in the range of approximately 180 nm to approximately 200 nm. The first fundamental laser 210A is configured to generate fundamental light 211A having a first fundamental wavelength in the range of approximately 720 nm to approximately 800 nm and a corresponding first fundamental frequency $\omega_{1A}$. First frequency doubling stage 220A receives the first fundamental light 211A and generates second harmonic light 212A with a second harmonic frequency $2\omega_{1A}$ equal to twice the first fundamental frequency $\omega_{1A}$. Final (second) frequency doubling stage 230A receives the second harmonic light (intermediate frequency light) 212A and generates the laser output light 239A with an output frequency $\omega_{OUT4}$ that is equal to four times the first fundamental frequency $\omega_{1A}$.

Referring to FIG. 2A, the first fundamental laser 210A is configured using known techniques to generate the first fundamental light 211A (referred to simply as the "fundamental") at first fundamental frequency $\omega_{1A}$. In one embodiment, the first fundamental laser 210A is configured such that the first fundamental light 211A is generated at a first fundamental frequency $\omega_{1A}$ corresponding to a wavelength between approximately 720 nm and approximately 800 nm (such as a wavelength of approximately 774 nm). In one embodiment, the first fundamental laser 210A is implemented using a titanium-sapphire (Ti-sapphire) lasing medium. Suitable fundamental lasers operating at wavelengths near 800 nm are commercially available. In order to generate sufficient light at a wavelength of approximately 193 nm for inspecting semiconductor wafers, reticles, or photomasks, first fundamental laser 210A should generate tens or hundreds of Watts of fundamental light 211A. Other applications may not require as much power or may need more power. Depending on the pulse width and repetition rate requirements for laser 200A, the first fundamental laser may be configured as a Q-switched laser, a mode-locked laser, or a CW laser.

First frequency doubling stage 220A is configured to generate second harmonic light 212A from the first fundamental light 211A. In one embodiment, first frequency doubling stage 220A incorporates a lithium triborate (LBO) nonlinear crystal configured for critical phase matching of the first fundamental frequency and the second harmonic frequency. First frequency doubling stage 220A may include other components as necessary, such as a prism for separating the second harmonic light 212A from unconsumed fundamental light. The first frequency doubling stage 220A may include a cavity resonant at the first fundamental frequency to increase the conversion efficiency.

Final frequency doubling stage 230A is configured to generate laser output light 239A from the second harmonic light 212A. Final frequency doubling stage 230A incorporates nonlinear crystal 300 configured to double the frequency of the second harmonic light 212A, and to output light 303 that includes light at the frequency of the laser output light 239A and unconsumed second harmonic light. Nonlinear crystal 300 comprises a stack of SBO plates. For purposes of illustration, FIG. 2A depicts four such plates, 335-1, 335-2, 335-3 and 335-4 stacked one on the other. Note that in embodiments, there may be tens or hundreds or thousands of stacked plates. FIG. 2A depicts the plates as touching one another. The plates may touch one another (e.g., the plates may be optically contacted to one another) or there may be small air gaps between the plates, the air gaps having widths similar to, or smaller than, a thickness of one plate. The thickness of each plate is chosen to enable quasi-phase matching for doubling the frequency of the second harmonic light 212A. Adjacent plates (such as plates 335-1 and 335-2) have their crystal c axes oriented in opposite directions relative to one another. These and other important aspects of the nonlinear crystal are described in detail below in relation to FIG. 3.

Final frequency doubling stage 230A may include other optical components as necessary, such as a prism for separating the laser output light 239A from unconsumed fundamental second harmonic light. Final frequency doubling stage 230A may include a cavity to recirculate the second harmonic frequency to increase the conversion efficiency.

In an alternative embodiment, a single cavity may include both first frequency doubling stage 220A and final frequency doubling stage 230A. These and other important aspects of this embodiment are described in detail below in relation to FIG. 4.

Figure 2B:
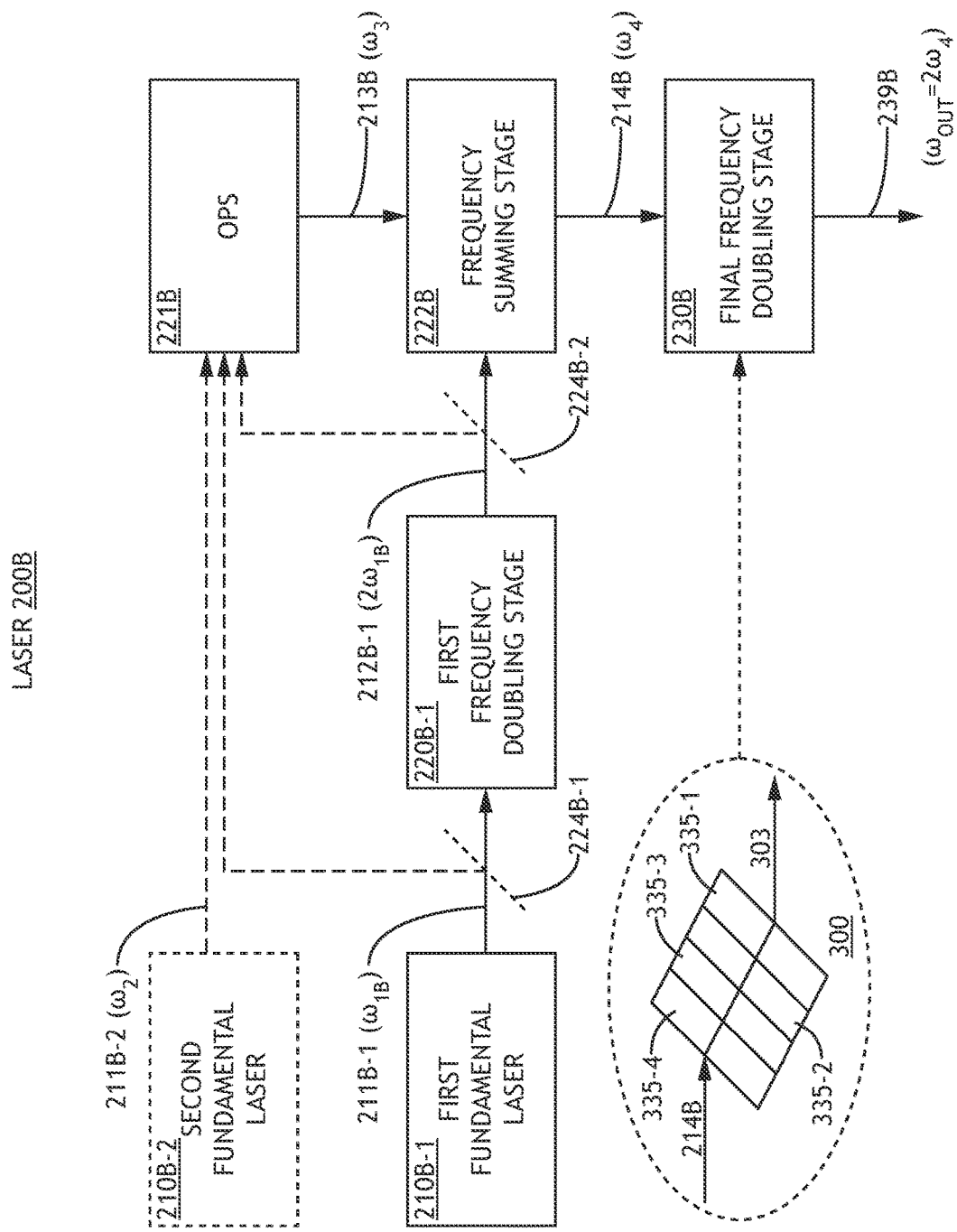

FIG. 2B is a simplified block diagram showing a laser assembly 200B configured to generate a wavelength in a range of approximately 180 nm to approximately 200 nm (e.g., approximately 193 nm), in accordance with one or more embodiments of the present disclosure. Laser assembly 200B comprises a first fundamental laser 210B-1 and four frequency conversion stages (e.g., a first frequency doubling stage 220B-1, an optical parametric system 221B, a first frequency doubling stage 220B-1, a frequency summing stage 222B and a final frequency doubling stage 230B) that are cooperatively configured to generate laser output light having a wavelength in the range of approximately 180 nm to approximately 200 nm. The first fundamental laser 210B-1 is configured to generate fundamental light 211B-1 having a first fundamental wavelength in a range of approximately 1.0 μm to approximately 1.1 μm and a corresponding first fundamental frequency $\omega_{1B}$. First frequency doubling stage 220B-1 receives the first fundamental light 211B-1 and generates second harmonic light 212B-1 with a second harmonic frequency $2\omega_{1B}$ equal to twice the first fundamental frequency $\omega_{1B}$. OPS 221B is configured to generate a third frequency light 213B having a frequency of $\omega_3$ and a corresponding wavelength a range of approximately 1.2 μm to approximately 2.0 μm. Frequency summing stage 222B is configured to receive light from OPS 221B and from first frequency doubling stage 220B-1 and generate intermediate frequency light 214B having an intermediate frequency equal to the sum of the frequencies of its inputs (i.e., equal to $2\omega_{1B}+\omega_3=\omega_4$). Final (second) frequency doubling stage 230B receives the intermediate frequency light 214B and generates the laser output light 239A with an output frequency $\omega_{OUT4}=4\omega_{1B}+2\omega_3=2\omega_4$ that is equal to twice the intermediate frequency with a corresponding wavelength in the range of approximately 180 nm to approximately 200 nm.

Referring to FIG. 2B, the first fundamental laser 210B-1 is configured using known techniques to generate the first fundamental light 2111B-1 at first fundamental frequency Wi. In one embodiment, the first fundamental laser 210B-1 is configured such that the first fundamental light 211B-1 is generated at a first fundamental frequency Wi corresponding to a wavelength in a range between approximately 1.0 μm and approximately 1.1 μm (such as a wavelength of approximately 1064 nm). In one embodiment, the first fundamental laser 210B-1 is implemented using one of a Nd-doped yttrium aluminum garnate (YAG) lasing medium, a Nd-doped yttrium orthovanadate lasing medium, and an ytterbium-doped fiber lasing medium. Suitable fundamental lasers operating at wavelengths near 1064 nm are commercially available. In order to generate sufficient light at a wavelength of approximately 193 nm for inspecting semiconductor wafers or reticles, first fundamental laser 210B-1 should generate tens or hundreds of Watts of fundamental light 211B-1. Other applications may not require as much power or may need more power. Depending on the pulse width and repetition rate requirements for laser 200B, the first fundamental laser 210B-1 may be configured as a Q-switched laser, a mode-locked laser or a CW laser.

First frequency doubling stage 220B-1 is configured to generate second harmonic light 212B-1 from the first fundamental light 211B-1. In one embodiment, first frequency doubling stage 220B-1 incorporates a lithium triborate (LBO) nonlinear crystal configured for critical phase matching to generate the second harmonic frequency from the first fundamental frequency. First frequency doubling stage 220B-1 may include other components as necessary, such as a prism for separating the second harmonic light 212B-1 from unconsumed first fundamental light. First frequency doubling stage 220B-1 may include a cavity configured to recirculate the first fundamental frequency to increase the conversion efficiency.

OPS 221B is configured to generate the third frequency light 213B having a frequency of $\omega_3$ and a corresponding wavelength in a range of approximately 1.2 μm to approximately 2.0 μm, such as a wavelength of approximately 1.4 μm. OPS 221B may use any known OPO configuration and/or optical parametric generator (OPG) configuration and/or amplification stage (for example a fiber amplifier, thin-disk amplifier, cavity amplifier, rod amplifier, optical parametric amplifier (OPA), or multi-pass amplifier) that is appropriate for the pulse width, pulse repetition rate, power and wavelength of the third frequency light 213B. OPS 221B may use any suitable nonlinear crystal for frequency conversion, including periodically poled materials. Suitable nonlinear crystals include lithium niobate and stoichiometric strontium tantalate. FIG. 2B depicts using dashed lines three alternative configurations for pumping OPS 221B.

In one embodiment, first fundamental light 211B-1 is divided into two portions by a beam splitter 224B-1 (which need only be included in this embodiment). A first portion of the first fundamental light is directed to first frequency doubling stage 220B-1 to generate second harmonic light 212B-1. A second portion of the first fundamental light is directed as pump light to OPS 221B. An advantage of this exemplary embodiment is that OPS 221B can be configured as an optical parametric oscillator (OPO) to convert the energy of the pump light (second portion of the first fundamental light 211B-1) into the third frequency light with high efficiency since the frequencies $\omega_{1B}$ and $\omega_3$ may be fairly close. However, since an idler (e.g., light having a frequency equal to $\omega_{1B}-\omega_3$) generated in OPS 221B configured as an OPO has a relatively low frequency and hence a relatively long wavelength, material suitable for a nonlinear crystal used in OPS 221B configured as an OPO may be expensive or difficult to obtain, since preferably that crystal should be reasonably transparent at the frequency of the idler in order to minimize thermal effects such as thermal dephasing or thermal lensing. For example, if first fundamental light has a wavelength of approximately 1064 nm, and the third frequency light has a wavelength of approximately 1400 nm, the idler will have a wavelength of approximately 4.4 μm.

In a second embodiment, second harmonic light 212B-1 is divided into two portions by a beam splitter 224B-2. A first portion of the second harmonic light is directed to frequency summing stage 222. A second portion of the second harmonic light is directed as pump light to OPS 221B. An advantage of this embodiment is that, since an idler (e.g., the unwanted light having a frequency equal to $2\omega_{1B}-\omega_3$) generated in OPS 221B configured as an OPO has a relatively high frequency and hence a relatively short wavelength, material suitable for a nonlinear crystal used in OPS 221B configured as an OPO may be inexpensive and easy to obtain. For example, if first fundamental light 211B-1 has a wavelength of approximately 1064 nm (and hence the second harmonic light 212B-1 has a wavelength of approximately 532 nm), and the third frequency light has a wavelength of approximately 1400 nm, the idler will have a wavelength of approximately 860 nm. However, this second embodiment will be less efficient than the first exemplary embodiment at converting energy of the pump light (second portion of the first fundamental light 211B-1) into the third frequency light since the frequencies $2\omega_{1B}$ and $\omega_3$ are further apart than $\omega_{1B}$ and $\omega_3$ resulting in more energy going into the idler.

In a third embodiment, laser 200B includes a second fundamental laser 210B-2 configured to generate second fundamental light 211B-2 having a frequency of $\omega_2$. Second fundamental light 2111B-2 is directed to OPS 221B as pump light. Second fundamental laser 210B-2 may use any convenient lasing medium capable of generating a suitable wavelength for pumping OPS 221B, including the exemplary lasing materials listed above in relation to first fundamental laser 210B-1. Second fundamental laser 210B-2 may be configured to generate a wavelength near 1064 nm, or near 532 nm by, for example, frequency doubling the output of a laser generating a wavelength near 1064 nm. Although the third embodiment may seem more complex than either of the first two embodiments, it may be preferred when multiple Watts of power are needed for laser output light 239B since a first fundamental laser 210B-1 having sufficient power may not be readily available or may be very expensive.

Frequency summing stage 222B is configured to receive light from OPS 221B and from first frequency doubling stage 220B-1 and generate intermediate frequency light 214B having an intermediate frequency equal to the sum of the frequencies of its inputs (i.e., equal to $2\omega_{1B}+\omega_3=\omega_4$). Intermediate frequency light 214B should have a wavelength between approximately 360 nm and 400 nm. In one embodiment, frequency summing stage 222B incorporates a lithium triborate (LBO) nonlinear crystal configured for critical phase matching to generate the intermediate frequency from summing the second harmonic frequency and the third frequency. Frequency summing stage 222B may include other optical components as necessary, such as a prism for separating the intermediate light 214B from unconsumed second harmonic light and unconsumed third frequency light. Frequency summing stage 222B may include a cavity resonant configured to recirculate the third frequency or the second harmonic frequency to increase the conversion efficiency.

Final frequency doubling stage 230B is configured to generate laser output light 239B from the intermediate frequency light 214B. Final frequency doubling stage 230B may be configured similarly to final frequency doubling stage 230A described above in reference to FIG. 2A. Final frequency doubling stage 230B incorporates nonlinear crystal 300 configured to double the frequency of the intermediate frequency light 214B, and to output light 303 that includes light at the frequency of the laser output light 239B and unconsumed intermediate frequency light. Nonlinear crystal 300 comprises a stack of SBO plates. For purposes of illustration, FIG. 2B depicts four such plates, 335-1, 335-2, 335-3 and 335-4 stacked one on the other. Note that in a practical embodiment, there may be tens, hundreds or thousands of stacked plates. FIG. 2B depicts the plates as touching one another. The plates may touch or there may be small air gaps between the plates with widths similar to, or smaller than, a thickness of one plate. The thickness of each plate is chosen to enable quasi-phase matching for doubling the frequency of the second harmonic light 214B. Adjacent plates (such as plates 335-1 and 335-2) have their crystal c axes oriented in opposite directions to one another. These and other important aspects of the nonlinear crystal are described in detail below in relation to FIG. 3.

Final frequency doubling stage 230B may include other optical components as necessary, such as a prism for separating the laser output light 239B from unconsumed intermediate frequency light. Final frequency doubling stage 230B may include a cavity configured to recirculate the intermediate frequency to increase the conversion efficiency.

Frequency summing stage 222B and final frequency doubling stage 230B may be included in a single cavity configured to recirculate light at the frequency of light from OPS 221B $\omega_3$ and/or at the frequency from the first frequency doubling stage 220B-1 $2\omega_{1B}$ and/or at the intermediate frequency light 214B having an intermediate frequency equal to $2\omega_{1B}+\omega_3=\omega_4$, to increase the conversion efficiency. These and other important aspects of the cavity are described in detail below in relation to FIG. 5.

Figure 3:
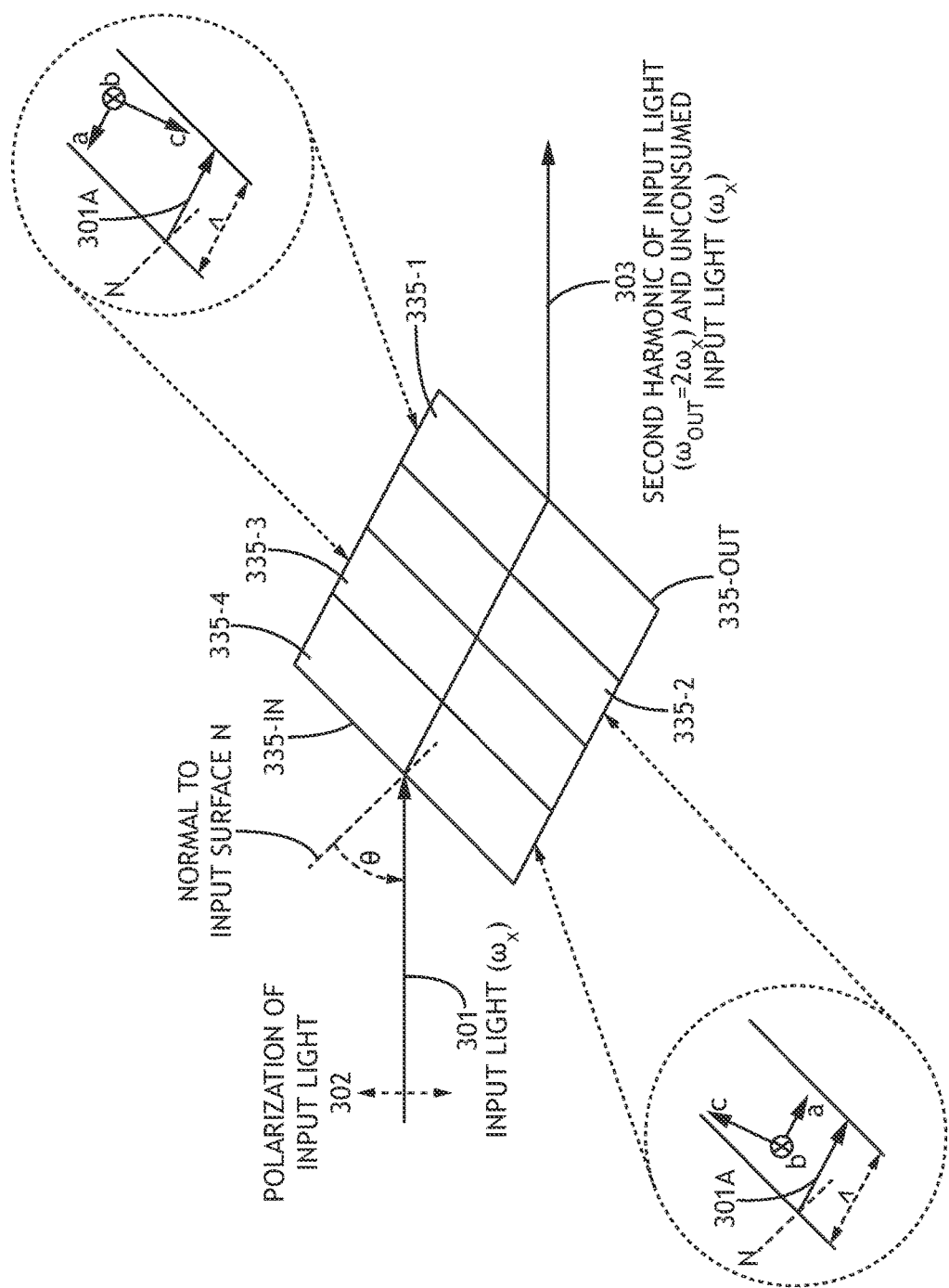
FIG. 3 illustrates a simplified diagram depicting a final frequency doubling stage utilized in the laser assemblies, in accordance with one or more embodiments of the present disclosure.

FIG. 3 illustrates details of a nonlinear crystal 300 including four stacked SBO plates 335-1 to 335-4 configured to double the frequency of input light 301 having a frequency $\omega_x$. Input light 301 may correspond to second harmonic light 212A in laser 200A of FIG. 2A, or may correspond to intermediate frequency light 214B in laser 200B of FIG. 2B. Although FIG. 3 illustrates nonlinear crystal 300 having a periodic structure including four stacked SBO crystal plates 335-1 to 335-4, the total number of SBO plates may be as few as two, may be more than ten, or may be more than 100. There may be an odd or even number of plates. The thickness of each of the SBO plates 335-1 to 335-4 may be hundreds of nanometers to hundreds of microns. Concretely, the SBO plate thickness A in a propagation direction of the light 301A inside a crystal plate is given by:

$$\Lambda=mL_c, \quad \text{(Equation 1)}$$

where m is an odd integer (e.g., 1,3,5,7 . . . ) and $L_c$ is a quasi-phase-matching (QPM) critical length $$L_c = \frac{\pi}{\Delta k}, \quad \text{(Equation 2)}$$

where $\Delta k$ is defined by $$\Delta k = k(2\omega_x) - 2k(\omega_x), \quad \text{(Equation 3)}$$

where $k(\omega)$ is the wavevector of light of frequency $\omega$ in nonlinear crystal 300 given by $$k(\omega) = \frac{\omega n(\omega)}{c}, \quad \text{(Equation 4)}$$

and where $n(\omega)$ is the refractive index of the nonlinear crystal for the appropriate polarization at frequency $\omega$ and c is the velocity of light in vacuum.

For doubling the frequency of input light 301 having a wavelength of 386.8 nm, the quasi-phase-matching critical length $L_c$ is about 0.85 μm (e.g., such as a thickness between 0.8 μm and 0.9 μm). A reasonable m may be in a range from 1 to about 999 to achieve a convenient slab thickness for handling and processing. This exemplary QPM critical length for generating light having a wavelength of 193.4 nm by frequency-doubling light having a wavelength of 386.8 nm was calculated from the relevant refractive indices of SBO using the Sellmeier model published by P. Trabs, F. Noack, A. S. Aleksandrovsky, A. I. Zaitsev, N. V. Radionov, and V. Petrov, in "Spectral fringes in non-phase-matched SHG and refinement of dispersion relations in the VUV," Opt. Express 23, 10091 (2015), which is incorporated herein by reference in the entirety. Furthermore, varying levels of impurities in an SBO crystal or the presence of defects within a crystal may slightly change values of the refractive indices of that crystal. One skilled in the relevant art would understand how to calculate the QPM critical length using the above equations for specific input and output frequencies given accurate refractive indices of the crystal.

Referring to FIG. 3, input light 301 of frequency $\omega_x$ is incident on input surface 335-IN of nonlinear crystal 300. The polarization direction of the input light 301 is illustrated by the dashed-line-arrow 302. The SBO plates 335-1 to 335-4 are stacked on top of one another so that input surface 335-IN and output surface 335-OUT are oriented approximately at Brewster's angle θ relative to the input light 301 of frequency $\omega_x$ so as to minimize reflection losses without using an antireflection coating. Brewster's angle is approximately equal to 60.3° with respect to the surface normal N for wavelengths near 386 nm polarized parallel to the c axis of an SBO crystal and is approximately equal to 61.9° with respect to the surface normal N for wavelengths near 193 nm with the same polarization direction. Reflection losses are low at any angle within a few degrees (e.g., such as within ±2°) of Brewster's angle, so there will be very low reflection losses for both the input light and the output light for any incident angle near 61°. Furthermore, since the precise angle is not critical to reflection losses, small adjustments can be made to the orientation of nonlinear crystal 300 (e.g., small adjustments to incident angle θ) to adjust the path length of the light A in the SBO plates in order to more precisely achieve QPM when the thickness of the plates is not precisely the intended thickness due to manufacturing variability. The light 303 exiting the stack of SBO plates comprises the second harmonic of the input light at a frequency of $2\omega_x$ and unconsumed input light at a frequency of $\omega_x$. In one embodiment, reflection losses at each interface are minimized by optically contacting the SBO plates together. In another embodiment, small air gaps may exist between the plates. By orienting the input and output surfaces close to Brewster's angle relative to the input light 301, reflection losses at each interface between air and an SBO plate may be very low. However, due to refraction at each SBO to air interface, the input light and the second harmonic of the input light may travel in slightly different directions in any air gap. Over many plates, this displacement can accumulate to a significant offset and may reduce the conversion efficiency. In order to minimize this effect, air gaps between the plate should preferably be kept to a few hundred nanometers or narrower, and the diameter of the beam of the input light should be as large as possible (such as about 100 µm or a few hundred microns) consistent with the desire for high power density to enable high conversion efficiency.

In order to create a periodic structure for QPM, SBO plates 335-1 to 335-4 are placed with one rotated relative to the other such that their corresponding c crystal axes are inverted with respect to each other as shown in the two insets of FIG. 3. The surface normal N of the SBO plate of thickness Λ (where Λ is the spacing between poles in the crystal) and the propagation direction of light 301A inside the SBO plate are shown in the two insets. This physical arrangement of the crystal plates allows for QPM. This may be considered as analogous to using PPLN (periodically poled lithium niobate) for QPM except that Lithium Niobate is a ferroelectric crystal and can be periodically poled. In contrast, SBO is non-ferroelectric, so we need to physically arrange the crystal plates to create a periodic structure for QPM. Furthermore, periodic poling requires applying an electric field parallel to a crystal axis of a ferroelectric crystal, so the poling direction is necessarily aligned with a crystal axis. In contrast, the SBO crystal plates disclosed herein can be cut and polished in any orientation relative to the crystal axes, so allowing the crystal plates to be cut and oriented at Brewster's angle relative to the light incident on the crystal plates.

In one embodiment, the crystal axes of SBO plates 335-1 to 335-4 are oriented such that light 301A propagating inside the SBO plates propagates approximately perpendicular to the c-axis with a polarization direction (electric field direction) of light 301A substantially parallel to the c-axis to take advantage of $d_{33}$ being the largest nonlinear optical coefficient of SBO and hence maximize conversion efficiency. For example, as depicted in FIG. 3, the crystal axes of SBO plate 335-2 may be oriented such that light 301A propagates substantially parallel to the a-axis of the SBO crystal. Alternatively, the crystal axes may be oriented such that light 301A propagates parallel to the b-axis, or at some angle within an a-b plane of the crystal. In other words, the crystal axes depicted in the two insets in FIG. 3 may be rotated about the c-axis. If the input surface 335-IN of SBO plate 335-4 is oriented at Brewster's angle with respect to input light 301, then the direction of propagation of the light 301A within plate 335-4 will be approximately 29.7° relative to surface normal N.

There are many ways to fabricate and assemble nonlinear crystal 300. When only a few plates are needed for a laser (such as when high conversion efficiency is not required), polishing the plates to a desired thickness and then stacking them in an appropriate orientation may be convenient. When hundreds (or more) of plates are required to achieve the required conversion efficiency, other fabrication methods may be more convenient. For example, U.S. patent application Ser. No. 17/555,404, entitled "Frequency Conversion Using Interdigitated Nonlinear Crystal Gratings" and filed Dec. 18, 2021, discloses interdigitated nonlinear crystal gratings and methods for fabricating the same, which is incorporated herein by reference in its entirety.

Figure 4:
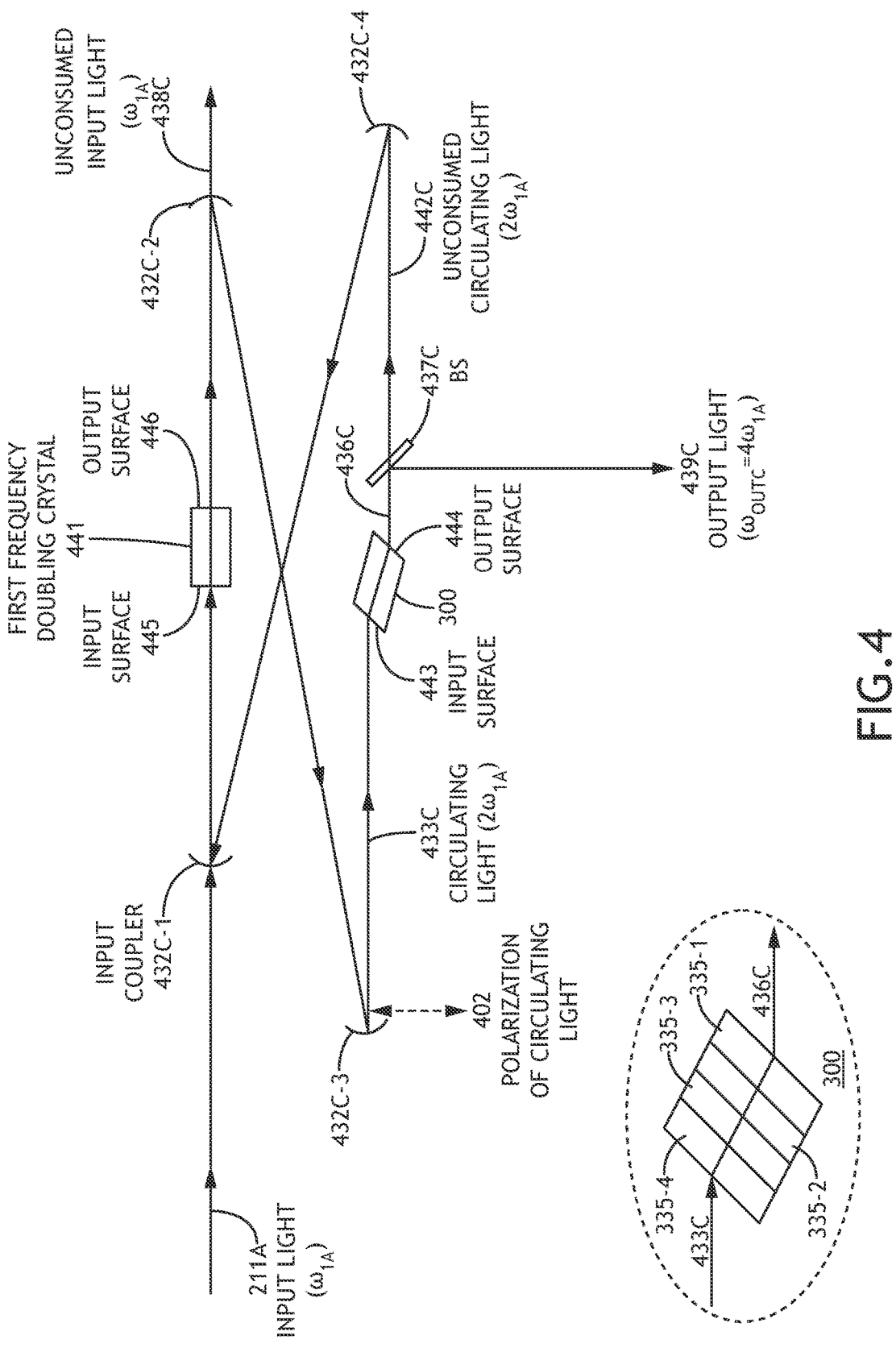
FIG. 4 illustrates a simplified diagram depicting a first and final frequency doubling stage utilized in the laser assemblies, in accordance with one or more embodiments of the present disclosure.

FIG. 4 is a simplified diagram showing a first frequency doubling stage and final frequency doubling stage cavity 400 that includes the first frequency doubling stage 220A and final frequency doubling stage 230A of FIG. 2A, according to an embodiment of the present disclosure. Input light 211A ($\omega_{1A}$) enters the bow-tie ring cavity comprising input coupler 432C-1, curved mirrors 432C-2, 432C-3, 432C-4 and first frequency doubling stage nonlinear crystal 441 (e.g., LBO), SBO nonlinear crystal 300, through input coupler 432C-1. Input light 211A (with frequency $\omega_{1A}$) enters the bow-tie ring cavity passing close to or through mirror 432C-1 and passes through the first frequency doubling crystal 441. Unconsumed input light of frequency $\omega_{1A}$ 4380 exits the cavity after passing close to or through mirror 432C-2. The output from the first frequency doubling crystal 441 includes the generated second harmonic light (with frequency $2\omega_{1A}$) 433C. The second harmonic light 433C is reflected from mirror 432C-2 and mirror 432C-3, and passes through SBO nonlinear crystal 300 (described in FIG. 3). The light at the output surface 444 of SBO nonlinear crystal 300 is 436C (with frequencies $2\omega_{1A}$ and $4\omega_{1A}$). The portion of 436C with frequency $2\omega_{1A}$ is unconsumed light 442C (with frequency $2\omega_{1A}$) which passes through beam splitter (BS) 437C and is reflected from mirror 432C-4 and input coupler 432C-1 and is recirculated in the cavity. The portion of 436C with frequency $4\omega_{1A}$ is reflected from the surface of beam splitter (BS) 437C and directed out of the cavity as output light 439C.

In embodiments, the first frequency doubling crystal 441 is configured so that input surface 445 and output surface 446 comprise antireflection coatings configured to transmit input light 221A and unconsumed input light 438C of frequency $\omega_{1A}$ and/or circulating light 433C and 442C of frequency $2\omega_{1A}$.

In embodiments, SBO plates 300 are configured so that input surface 443 and output surface 444 are oriented approximately at Brewster's angle relative to the circulating light 433C and 442C of frequency $2\omega_{1A}$. The polarization direction of light 433C and 442C is illustrated by arrow 402. Furthermore, BS 437C may be configured to laterally displace light 442C circulating in the cavity by an amount that substantially offsets the lateral displacement of light 433C caused by the two or more SBO plates 300, so as to maintain a substantially symmetric bow-tie cavity and simplify optical alignment of the cavity.

In one embodiment, SBO plates 300 are configured so that input surface 443 comprises an antireflection coating configured to transmit circulating light 443C and 442C, both of frequency $2\omega_{1A}$, and output surface 444 comprises an antireflection coating configured to transmit output light 439C of frequency $4\omega_{1A}$ and transmit circulating light 443C and 442C, both of frequency $2\omega_{1A}$. Input surface 443 and output surface 444 are oriented not necessarily at the Brewster's angle relative to the circulating light 433C and 442C of frequency $2\omega_{1A}$.

In one embodiment, BS 437C may comprise an SBO crystal, SBO glass or a $CaF_2$ crystal. Since SBO has good deep-UV transmission and has a high damage threshold, SBO may advantageously be used as a substrate material for the BS 437C to ensure long life in spite of the high-power level of the unconsumed input light 442C circulating in the cavity. If 437C comprises an SBO crystal, its thickness and/or the orientation of its crystal c axis may be configured so as to minimize any frequency doubling of the unconsumed circulating light 442C passing through it. BS 437C may comprise a dichroic beam splitter, prism or other component to separate the wavelengths.

In an alternative embodiment, the input surface of the first frequency doubling crystal 441 and/or the two or more SBO crystal plates 300 may be coated with an appropriate antireflection coating instead of orienting the input surfaces 445,443 and output surfaces 446,444 at Brewster's angle.

In an alternative embodiment, the frequency doubling crystal 441 is outside the cavity, and input light 211A passes first through frequency doubling crystal 441 before entering the cavity through input coupler 432C-1. In this embodiment, circulating light 433C and 442C with frequency $2\omega_{1A}$ would be created outside the cavity and optically coupled into the cavity through input coupler 432C-1.

Although FIG. 4 depicts first frequency doubling stage and final frequency doubling stage cavity 400 as comprising four curved mirrors, other combinations of mirrors and/or lenses may be used to refocus the light circulating in the cavity. In an alternative embodiment, first frequency doubling stage and final frequency doubling stage cavity 400 may comprise a delta cavity, a standing-wave cavity, or other shaped cavity instead of a bow-tie cavity. In an alternative embodiment, any combination of the frequencies involved may be circulated. Any of these cavities can be stabilized with standard PDH (Pound-Drever-Hall) or HC (Hansch-Couillaud) locking techniques. The length of a resonant cavity may be adjusted to maintain resonance by adjusting the position of one of the mirrors (such as mirror 432C-4 in FIG. 4) or the position of a prism, through a control signal (not shown) connected to a piezo-electric transducer (PZT), voice coil or other actuator.

Figure 5:
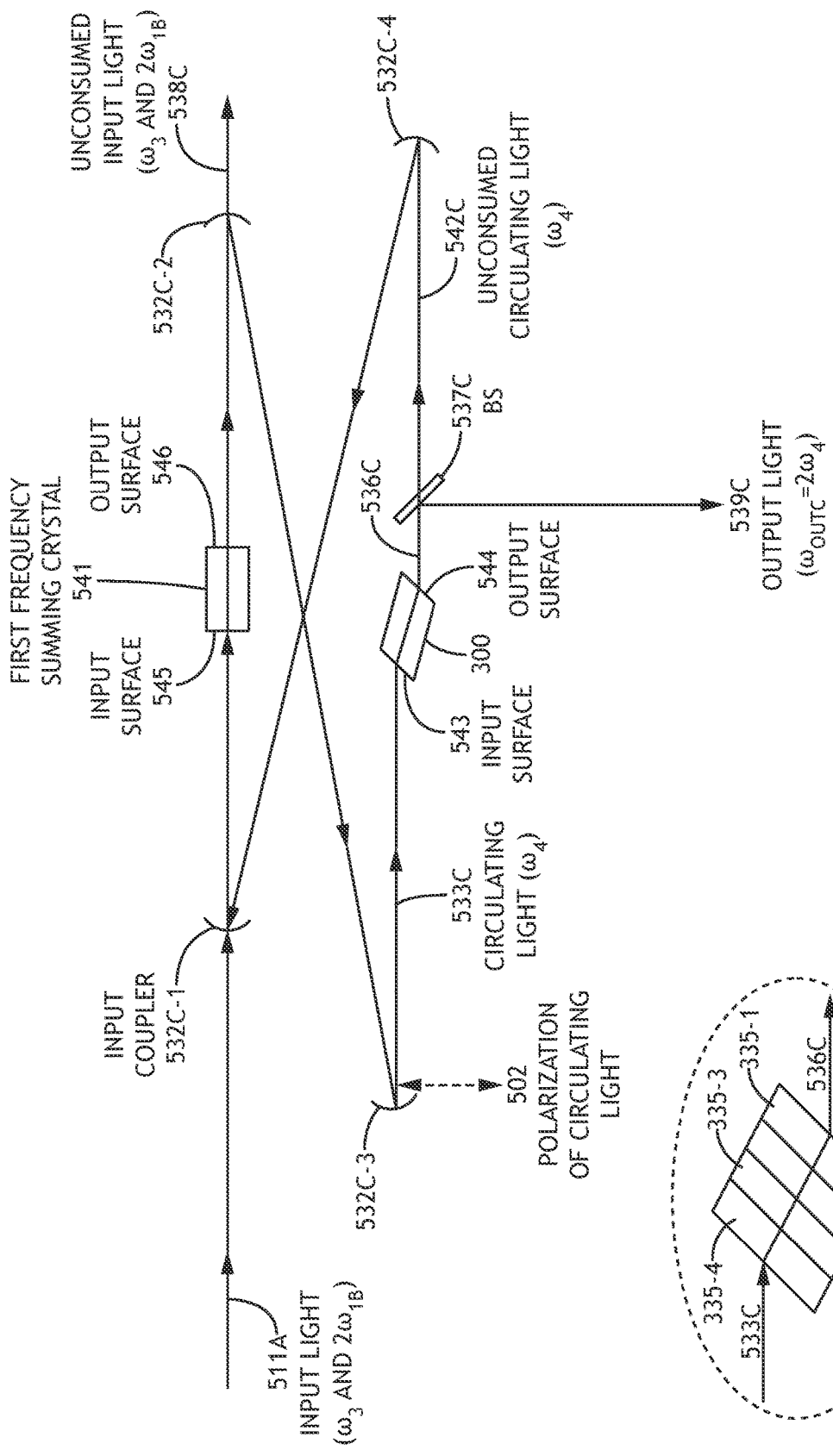
FIG. 5 illustrates a simplified diagram depicting a frequency summing and final frequency doubling stage utilized in the laser assemblies, in accordance with one or more embodiments of the present disclosure.

FIG. 5 is a simplified diagram showing a frequency summing stage and final frequency doubling stage cavity 500 utilized in the frequency summing stage 222B and final frequency doubling stage 230B of FIG. 2B, according to embodiments of the present disclosure. Input light 511A (light 213B ($\omega_3$) and light 212B-1 ($2\omega_{1B}$) from FIG. 2B) enters the bow-tie ring cavity comprising input coupler 532C-1, curved mirrors 532C-2, 532C-3, 532C-4, frequency summing stage nonlinear crystal 541 (for example, LBO), and SBO nonlinear crystal 300, through input coupler 532C-1. Input light 511A (comprising of frequencies $\omega_3$ and $2\omega_{1B}$) enters the bow-tie ring cavity passing close to or through mirror 532C-1 and passes through the frequency summing crystal 541. Unconsumed input light of frequencies $\omega_3$ and $2\omega_{1B}$ 538C exits the cavity after passing close to or through mirror 532C-2. The output from the frequency summing crystal 541 includes the generated output light (with frequency $\omega_4=2\omega_3+4\omega_{1B}$) 533C. The output light 533C is reflected from mirror 532C-2 and mirror 532C-3, and passes through SBO nonlinear crystal 300 (described in FIG. 3). The light at the output surface 544 of SBO nonlinear crystal 300 is 536C (with frequencies $2\omega_4$ and $\omega_4$). The portion of 536C with frequency $\omega_4$ is unconsumed light 542C (with frequency $\omega_4$) which passes through beam splitter (BS) 537C and is reflected from mirror 532C-4 and input coupler 532C-1 is recirculated in the cavity. The portion of light 536C with frequency $2\omega_4$ is reflected from the surface of beam splitter (BS) 537C and directed out of the cavity as output light 539C.

In embodiments, the first frequency summing crystal 541 is configured so that input surface 545 and output surface 546 comprise antireflection coatings configured to transmit input light 511A and unconsumed input light 538C of frequencies $\omega_3$ and $2\omega_{1B}$ and/or circulating light 533C and 542C of frequency $\omega_4$.

In embodiments, SBO plates 300 are configured so that input surface 543 and output surface 544 are oriented approximately at Brewster's angle relative to the circulating light 533C and 542C of frequency $\omega_4$. The polarization direction of light 533C and 542C is illustrated by arrow 502. Furthermore, BS 537C may be configured to laterally displace light 542C circulating in the cavity by an amount that substantially offsets the lateral displacement of light 533C caused by the two or more SBO plates 300, so as to maintain a substantially symmetric bow-tie cavity and simplify optical alignment of the cavity.

In one embodiment, SBO plates 300 are configured so that input surface 543 and output surface 544 comprise of antireflection coatings configured to transmit circulating light 533C and 542C, both of frequency $\omega_4$, at the angle at which input surface 543 and output surface 544 are oriented relative to circulating light 533C and 542C, which is not necessarily the Brewster's angle relative to the circulating light 533C and 542C of frequency $\omega_4$.

In one embodiment, BS 537C may comprise an SBO crystal, SBO glass or a $CaF_2$ crystal. Since SBO has good deep UV transmission and has a high damage threshold, SBO may advantageously be used as a substrate material for the BS 537C to ensure long life in spite of the high-power level of the unconsumed input light 542C circulating in the cavity. If 537C comprises an SBO crystal, its thickness and/or the orientation of its crystal c axis may be configured so as to minimize any frequency doubling of the unconsumed input light 542C passing through it. BS 537C may comprise a dichroic beam splitter, prism or other component to separate the wavelengths.

In an alternative embodiment, the input surface of the first frequency doubling crystal 541 and/or the two or more SBO crystal plates 300 may be coated with an appropriate anti-reflection coating instead of orienting the input surfaces 545, 543 and output surfaces 546, 544 at Brewster's angle.

In an alternative embodiment, the frequency summing crystal 541 is outside the cavity, and input light 511A passes first through frequency summing crystal 541 before entering the cavity through input coupler 532C-1. In this embodiment, circulating light 533C and 542C with frequency $\omega_4$ would be created outside the cavity and optically coupled into the cavity through input coupler 532C-1.

Although FIG. 5 depicts frequency summing stage and final frequency doubling stage cavity 500 as comprising four curved mirrors, other combinations of mirrors and/or lenses may be used to refocus the light circulating in the cavity. In an alternative embodiment, frequency summing stage and final frequency doubling stage cavity 500 may comprise a delta cavity, a standing-wave cavity, or other shaped cavity instead of a bow-tie cavity. In an alternative embodiment, any combination of the frequencies involved may be circulated. Any of these cavities can be stabilized with standard PDH or HC locking techniques. The length of a resonant cavity may be adjusted to maintain resonance by adjusting the position of one of the mirrors (such as mirror 532C-4 in FIG. 5) or the position of a prism, through a control signal (not shown) connected to a piezo-electric transducer (PZT), voice coil or other actuator.

Figure 6:
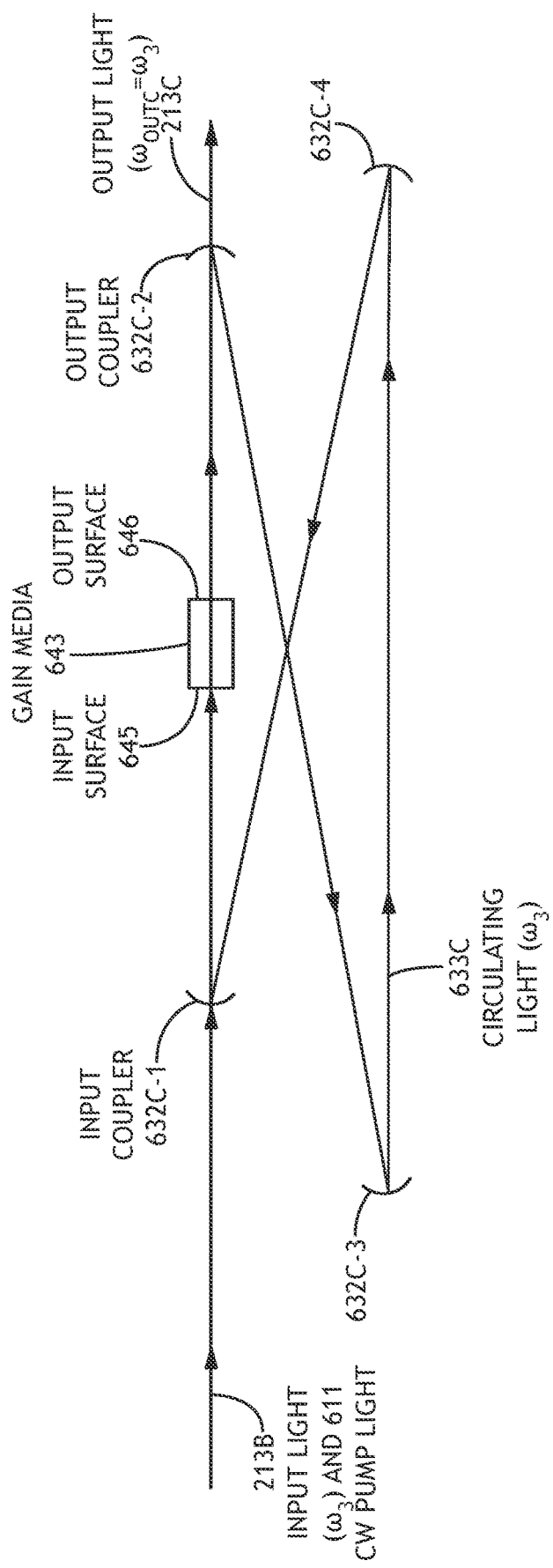
FIG. 6 illustrates a simplified diagram depicting an amplification stage utilized in the optical parametric system (OPS) utilized in the laser assemblies, in accordance with one or more embodiments of the present disclosure.

FIG. 6 is a simplified diagram showing an amplification stage 600 utilized in the OPS 221B of FIG. 2B, according to embodiments of the present disclosure. Input light 213B ($\omega_3$) is generated by an OPO or OPG. Input light 213B ($\omega_3$) and CW pump light 611 enter the bow-tie ring cavity comprising input coupler 632C-1, curved mirror 632C-2, flat mirrors 632C-3, 632C-4 and gain medium 643, through input coupler 632C-1. Input light 213B (comprising of frequency $\omega_3$) enters the bow-tie ring cavity passing close to or through mirror 632C-1 and passes through the gain medium 643 (for example, an Nd-doped YAG rod). CW pump light 611 is a frequency and power suitable for pumping the gain medium 643 to enable stimulated emission for light of frequency $\omega_3$ comprising of input light 213B.

CW pump light 611 may correspond to any one of 211B-1 ($\omega_{1B}$), 211B-2 ($\omega_2$) or 212B-1 ($2\omega_{1B}$) of FIG. 2B. The output from the gain medium 643 includes the amplified input light (with frequency $\omega_3$) 633C. The output light 633C is partially reflected from output coupler 632C-2, mirror 632C-3, mirror 632C-4, and input coupler 632C-1, and is therefore recirculated within the cavity. A portion of the circulating light 633C is optically coupled out of the cavity through output coupler 632C-2 as output light 213C (with frequency $\omega_3$).

In embodiments, the gain medium 643 are configured so that input surfaces 645 and output surfaces 646 contain anti-reflection coatings for input light 213B and CW pump light 611. In an alternative embodiment, gain medium 643 is oriented approximately at Brewster's angle relative to the circulating light 633C ($\omega_3$).

In embodiments, diodes emitting pump light 611 are configured to side-pump gain medium 643. These diodes are positioned parallel to input light 213B on one or more sides of gain medium 643 so as to emit pump light 611 into gain medium 643 perpendicular to input light 213B. In this embodiment, pump light 611 can be coherent, incoherent, quasi-CW, CW, or pulsed.

Although FIG. 6 depicts amplification stage 600 as comprising two curved mirrors and two flat mirrors, other combinations of mirrors and/or lenses may be used to refocus the light circulating in the cavity. In an alternative embodiment, amplification stage 600 may comprise a delta cavity, a standing-wave cavity, or other shaped cavity instead of a bow-tie cavity. Any of these cavities can be stabilized with standard PDH or HC locking techniques. The length of a resonant cavity may be adjusted to maintain resonance by adjusting the position of one of the mirrors (such as mirror 632C-4 in FIG. 6) or the position of a prism, through a control signal (not shown) connected to a piezo-electric transducer (PZT), voice coil or other actuator.

Figure 7:
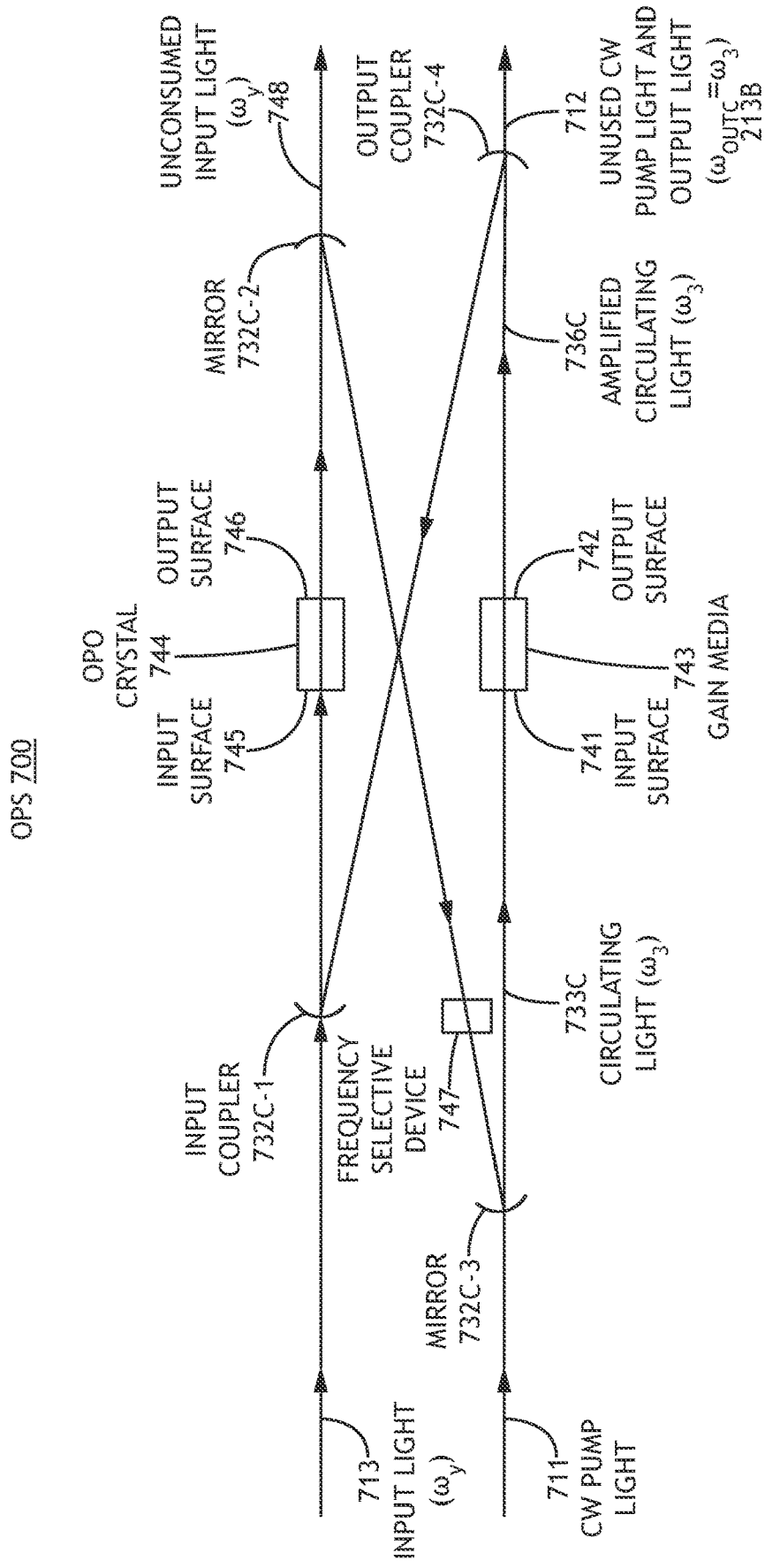
FIG. 7 illustrates a simplified diagram depicting an OPS utilized in the laser assemblies, in accordance with one or more embodiments of the present disclosure.

FIG. 7 is a simplified diagram showing an exemplary OPS 700 utilized as the OPS 221B of FIG. 2B, according to embodiments of the present disclosure. Input light 713 ($\omega_y$, comprising one of 211B-1 ($\omega_{1B}$), 212B-1 ($2\omega_{1B}$), or 211B-2 ($\omega_2$) from FIG. 2B) enters the bow-tie ring cavity comprising input coupler 732C-1, curved mirrors 732C-2 and 732C-3, output coupler 732C-4, OPO crystal 744 (for example, PPLN), gain medium 743 and frequency selective device 747, through input coupler 732C-1. Input light 713 (comprising of frequency $\omega_y$) enters the bow-tie ring cavity passing close to or through mirror 732C-1 and passes through the OPO crystal 744. Unconsumed input light 748 of frequency $\omega_y$ exits the cavity after passing close to or through mirror 732C-2. The output from the OPO crystal 744 includes the generated circulating light (with frequency $\omega_3$) 733C. Circulating light 733C is reflected from mirror 732C-2 and passes through frequency selective device 747 (for example, a transmission volume Bragg grating), reflects from mirror 732C-3, and passes through gain medium 743. The amplified circulating light 736C (with frequency $\omega_3$) at the output surface 742 of the gain medium is partially reflected from output coupler 732C-4. The output light 213B transmitted through output coupler 732C-4 has frequency $\omega_3$. Amplified circulating light 736C partially reflected from output coupler 732C-4 is reflected from the 732C-1 input coupler and is thereby recirculated inside the cavity. CW pump light 711 is optically coupled into the cavity through mirror 732C-3 and passes through gain medium 743. Unused CW pump light 712 exits the cavity through output coupler 732C-4. CW pump light 711 has a frequency and power suitable for the gain medium 743 to enable stimulated emission for light of frequency $\omega_3$ comprising of circulating light 733C.

In embodiments, the OPO crystal 744 and gain medium 743 are configured so that input surfaces 745, 741 and output surfaces 746, 742 contain anti-reflection coatings for circulating light 733C and 736C and input light 713 (for OPO crystal 744) or CW pump light 711 (for gain medium 743). In an alternative embodiment, gain medium 743 is oriented approximately at Brewster's angle relative to the circulating light 733C, 736C ($\omega_3$) and CW pump light 711. In an alternative embodiment, OPO crystal 744 is oriented approximately at Brewster's angle relative to the circulating light 733C, 736C ($\omega_3$) and input light 713 ($\omega_3$).

In embodiments, diodes emitting pump light 711 are configured to side-pump gain medium 743. These diodes are positioned parallel to input light 713 on one or more sides of gain medium 743 so as to emit pump light 711 into gain medium 743 perpendicular to input light 713. In this embodiment, pump light 711 can be coherent, incoherent, quasi-CW, CW, or pulsed.

In embodiments, frequency selective device 747 may comprise a transmissive or reflective grating or other frequency selective method to control the wavelength or bandwidth of circulating light 733C, amplified circulating light 736C, and output light 213B. In one embodiment, frequency selective device 747 is configured as a reflective frequency selective device (for example, a reflective volume Bragg grating) in a cavity (for example, a linear cavity) to reflect circulating light 733C or amplified circulating light 736C in place of a cavity mirror.

Although FIG. 7 depicts OPS 700 as comprising four curved mirrors, other combinations of mirrors and/or lenses may be used to refocus the light circulating in the cavity. In an alternative embodiment, frequency summing stage and OPS 700 may comprise a delta cavity, a standing-wave cavity, or other shaped cavity instead of a bow-tie cavity. Any of these cavities can be stabilized with standard PDH or HC locking techniques. The cavity length is adjusted to maintain resonance by adjusting the position of one of the mirrors (such as mirror 732C-4 in FIG. 7) or the position of a prism, through a control signal (not shown) connected to a piezo-electric transducer (PZT), voice coil or other actuator.

The above-described figures are not meant to represent the actual physical layout of the components. The above-described figures show the main optical modules involved in the process, but do not show every optical element. One skilled in the appropriate arts would understand how to build a laser generating a wavelength near 193 nm from the above-described figures and their associated descriptions. It is to be understood that more or fewer optical components may be used to direct the light where needed. Lenses and/or curved mirrors may be used to focus the beam waist to foci of substantially circular or elliptical cross sections inside or proximate to the nonlinear crystals where appropriate. Prisms, beam-splitters, gratings or diffractive optical elements may be used to steer or separate the different wavelengths at the outputs of each frequency conversion stage when needed. Prisms, coated mirrors, or other elements may be used to combine the different wavelengths at the inputs to the frequency conversion stages as appropriate. Beam splitters or coated mirrors may be used as appropriate to divide one wavelength into two beams. Filters may be used to block or separate undesired wavelengths at the output of any stage. Waveplates may be used to rotate the polarization as needed. Other optical elements may be used as appropriate. One skilled in the appropriate arts would understand the various tradeoffs and alternatives that are possible in the implementation of the lasers disclosed herein.

Although the present invention is described herein using various fundamental wavelengths that facilitate generating laser output light at a desired wavelength of approximately 193 nm, other wavelengths within a few or a few tens of nanometers of this desired wavelength can be generated by changing the wavelength of the first fundamental laser (either laser 200A or 200B) or changing the wavelength of the light output by the OPS (laser 200B). Unless otherwise specified in the appended claims, such lasers and systems utilizing such lasers are considered within the scope of this invention.

Lasers with a wavelength in the sub-200 nm are not commercially available at sufficient power level or are unreliable or expensive to operate. In particular, there is no prior art other than excimer lasers for generating 1W of light power or more in a wavelength range between approximately 180 nm and 200 nm. The embodiments of the present invention generate a wavelength near 193 nm, therefore provide better sensitivity for detecting small particles and defects than longer wavelengths. The lasers of the present invention do not use toxic or corrosive gasses, and are therefore easier and less expensive to operate and maintain.

One skilled in the appropriate arts will readily appreciate that there are many possible applications of the inventive lasers described herein in addition to their use in semiconductor inspection and metrology. For example, a laser operating at a wavelength close to 193.4 nm can be used in a lithography system configured to expose patterns into photoresist coated on a substrate such as a semiconductor wafer. In another example, a laser operating at a wavelength between about 180 nm and 200 nm may be used in a system configured to cut or ablate biological tissue. The lasers described herein can be configured to generate very short pulses at the output wavelength, which can enable preferential removal of material by ablation instead of by heating thereby causing less damage to surrounding material. For example, such lasers may be used in laser eye surgery or laser vision correction. Although the present invention has been described with respect to certain specific embodiments, it will be clear to those skilled in the art that the inventive features of the present invention are applicable to other embodiments as well, all of which are intended to fall within the scope of the present disclosure.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The description is presented to enable one of ordinary skill in the art to make and use the disclosure as provided in the context of a particular application and its requirements. As used herein, directional terms such as "top," "bottom," "over," "under," "upper," "upward," "lower," "down," and "downward" are intended to provide relative positions for purposes of description and are not intended to designate an absolute frame of reference. Various modifications to the preferred embodiment will be apparent to those with skill in the art, and the general principles defined herein may be applied to other embodiments. Therefore, the present disclosure is not intended to be limited to the particular embodiments shown and described but is to be accorded the widest scope consistent with the principles and novel features herein disclosed.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
a light source configured to generate light having a wavelength in a range between 180 nm and 200 nm; and
an optical system configured to direct the light onto a sample,
wherein the light source comprises:
a first fundamental laser configured to generate a fundamental laser beam having a corresponding fundamental frequency;
one or more intermediate frequency conversion stages collectively configured to generate an intermediate frequency light using the fundamental laser beam, the intermediate frequency light having an associated intermediate frequency and a corresponding intermediate wavelength between 360 nm and 400 nm;
a final frequency doubling stage configured to pass the intermediate frequency light through a nonlinear crystal,
wherein the nonlinear crystal includes a plurality of strontium tetraborate (SBO) crystal plates disposed in a stacked configuration such that each first SBO crystal plate is adjacent to at least one second crystal plate, and
wherein the plurality of SBO crystal plates are cooperatively configured to form a periodic structure that achieves quasi-phase-matching (QPM) of the intermediate frequency light such that light exiting the nonlinear crystal includes laser output light having an output frequency with a corresponding wavelength in the range of approximately 180 nm to approximately 200 nm.

2. The inspection system of claim 1, wherein the plurality of SBO crystal plates are configured such that a first crystal axis of the first SBO crystal plate is inverted with respect to a second crystal axis of the second SBO crystal plate.

3. The inspection system of claim 1, wherein the output frequency corresponds to a wavelength of approximately 193 nm.

4. The inspection system of claim 1, wherein the first fundamental laser is configured to generate a wavelength between approximately 760 nm and approximately 800 nm, and wherein the one or more intermediate frequency conversion stages are configured to double the frequency of the first fundamental laser beam to generate the intermediate frequency light.

5. The inspection system of claim 4, wherein the first fundamental laser comprises a Ti-sapphire laser.

6. The inspection system of claim 1, wherein the first fundamental laser is configured to generate a first fundamental laser beam having a wavelength between approximately 1 μm and approximately 1.1 μm, and wherein the one or more intermediate frequency conversion stages comprise:
a first frequency doubling stage optically coupled to the first fundamental laser and configured to double the frequency of at least a first portion of the first fundamental laser beam to generate second harmonic light;
an optical parametric system (OPS) configured to generate a third frequency light having a wavelength between approximately 1.2 μm and approximately 2.0 μm; and
a frequency summing stage optically coupled to the first frequency doubling stage and to the OPS, and configured to sum at least a first portion of the second harmonic light and the third frequency light to generate the intermediate frequency light.

7. The inspection system of claim 6, wherein the one or more intermediate frequency conversion stages are further configured to direct a second portion of the first fundamental laser beam to the OPS as a pump.

8. The inspection system of claim 6, wherein the one or more intermediate frequency conversion stages are further configured to direct a second portion of the second harmonic light to the OPS as a pump.

9. The inspection system of claim 6, the system further comprising a second fundamental laser, the second fundamental laser configured to generate a second fundamental laser beam and optically coupled to the OPS to optically pump the OPS with the second fundamental laser beam.

10. The inspection system of claim 1, wherein the first fundamental laser beam comprises one of a Nd-doped yttrium aluminum garnet (YAG) laser, a Nd-doped yttrium orthovanadate laser, and an Yb-doped fiber laser.

11. The inspection system of claim 1, the inspection system further comprising first optics configured to direct the laser output light to the sample and second optics configured to collect at least one of light transmitted, reflected and scattered by the substrate, and direct the collected light to a sensor.

12. The inspection system of claim 11, the inspection system further comprising a computer operably connected to the sensor and configured to determine the presence or absence of a defect on the substrate by analyzing a signal from the sensor.

13. The inspection system of claim 1, wherein generating the third frequency light utilizes an optical parametric system (OPS), comprising at least one of an optical parametric oscillator (OPO), an optical parametric generator (OPG), and an amplification stage.

14. The inspection system of claim 13, wherein the amplification stage comprises at least one of a fiber amplifier, a thin-disk amplifier, a cavity amplifier, a rod amplifier, an optical parametric amplifier (OPA), and a multi-pass amplifier.

15. The inspection system of claim 1, wherein the OPS comprises an optical parametric generator configured to generate third frequency light, the OPG optically coupled to a cavity, the cavity connected to an amplifier configured to amplify the third frequency light.

16. The inspection system of claim 1, wherein the OPS comprises an OPO cavity configured to recirculate light having the third frequency, wherein the cavity comprises an amplifier configured to amplify the third frequency light.

17. The inspection system of claim 1, wherein the final frequency doubling stage further comprises a cavity containing the plurality of SBO plates and configured to recirculate light having the intermediate frequency.

18. The inspection system of claim 1, wherein the frequency summing stage further comprises a cavity configured to recirculate light having the intermediate frequency and containing the plurality of SBO plates.

19. A laser assembly configured to generate laser output light comprising:
a first fundamental laser configured to generate a fundamental laser beam having a corresponding fundamental frequency;
one or more intermediate frequency conversion stages collectively configured to generate an intermediate frequency light using the fundamental laser beam, the intermediate frequency light having an associated intermediate frequency and a corresponding intermediate wavelength between approximately 360 nm and approximately 400 nm;

a final frequency doubling stage configured to pass the intermediate frequency light through a nonlinear crystal, wherein the nonlinear crystal includes a plurality of strontium tetraborate (SBO) crystal plates disposed in a stacked configuration such that each first the SBO crystal plate is adjacent to at least one second the crystal plate, and wherein the plurality of SBO crystal plates are cooperatively configured to form a periodic structure that achieves quasi-phase-matching (QPM) of the intermediate frequency light such that light exiting the nonlinear crystal includes laser output light having the output frequency with a corresponding wavelength in the range of approximately 180 nm to approximately 200 nm.

20. The laser assembly of claim 19, wherein the plurality of SBO crystal plates are configured such that a first crystal axis of the first SBO crystal plate is inverted with respect to a second crystal axis of the second SBO crystal plate.

21. The laser assembly of claim 19, wherein the output frequency corresponds to a wavelength of approximately 193 nm.

22. The laser assembly of claim 19, wherein the first fundamental laser is configured to generate a wavelength between approximately 760 nm and approximately 800 nm, and wherein the one or more intermediate frequency conversion stages are configured to double the frequency of the first fundamental laser beam to generate the intermediate frequency light.

23. The laser assembly of claim 22, wherein the first fundamental laser comprises a Ti-sapphire laser.

24. The laser assembly of claim 19, wherein the first fundamental laser is configured to generate a first fundamental laser beam having a wavelength between approximately 1 μm and approximately 1.1 μm, and wherein the one or more intermediate frequency conversion stages comprise:

a first frequency doubling stage optically coupled to the first fundamental laser and configured to double the frequency of at least a first portion of the first fundamental laser beam to generate second harmonic light;

an optical parametric system (OPS) configured to generate a third frequency light having a wavelength between approximately 1.2 μm and approximately 2.0 μm; and a frequency summing stage optically coupled to the first frequency doubling stage and to the OPS, and configured to sum at least a first portion of the second harmonic light and the third frequency light to generate the intermediate frequency light.

25. The laser assembly of claim 24, wherein the one or more intermediate frequency conversion stages are further configured to direct a second portion of the first fundamental laser beam to the OPS as an optical pump.

26. The laser assembly of claim 24, wherein the one or more intermediate frequency conversion stages are further configured to direct a second portion of the second harmonic light to the OPS as an optical pump.

27. The laser assembly of claim 24, the system further comprising a second fundamental laser, the second fundamental laser configured to generate a second fundamental laser beam and optically coupled to the OPS to optically pump the OPS with the second fundamental laser beam.

28. The laser assembly of claim 24, wherein the first fundamental laser beam comprises one of a Nd-doped yttrium aluminum garnet (YAG) laser, a Nd-doped yttrium orthovanadate laser, and an Yb-doped fiber laser.

29. The laser assembly of claim 19, wherein generating the third frequency light utilizes an optical parametric system (OPS), comprising at least one of an optical parametric oscillator (OPO), an optical parametric generator (OPG), and an amplification stage.

30. The laser assembly of claim 29, wherein the amplification stage comprises at least one of a fiber amplifier, a thin-disk amplifier, a cavity amplifier, a rod amplifier, an optical parametric amplifier (OPA), and a multi-pass amplifier.

31. The laser assembly of claim 19, wherein the OPS comprises an optical parametric generator configured to generate third frequency light, the OPG optically coupled to a cavity, the cavity connected to an amplifier configured to amplify the third frequency light.

32. The laser assembly of claim 19, wherein the OPS comprises an OPO cavity configured to recirculate light having the third frequency, wherein the cavity comprises an amplifier configured to amplify the third frequency light.

33. The laser assembly of claim 19, wherein the final frequency doubling stage further comprises a cavity configured to recirculate light having the intermediate frequency and containing the plurality of SBO plates.

34. The laser assembly of claim 19, wherein the frequency summing stage further comprises a cavity configured to recirculate light having the intermediate frequency and containing the plurality of SBO plates.

* * * * *